United States Patent
Lee et al.

(10) Patent No.: US 12,095,308 B2
(45) Date of Patent: Sep. 17, 2024

(54) POWER SUPPLY DEVICE AND POWER SUPPLY SYSTEM

(71) Applicant: LS ELECTRIC CO., LTD., Anyang-si (KR)

(72) Inventors: Jiheon Lee, Anyang-si (KR); Younggeun Kim, Anyang-si (KR); Heejung Kim, Anyang-si (KR); Ilhyung Lim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 506 days.

(21) Appl. No.: 17/274,703

(22) PCT Filed: Sep. 10, 2019

(86) PCT No.: PCT/KR2019/011668
§ 371 (c)(1),
(2) Date: Mar. 9, 2021

(87) PCT Pub. No.: WO2020/055078
PCT Pub. Date: Mar. 19, 2020

(65) Prior Publication Data
US 2022/0052550 A1    Feb. 17, 2022

(30) Foreign Application Priority Data

Sep. 13, 2018  (KR) .......... 10-2018-0109528
Sep. 4, 2019  (KR) .......... 10-2019-0109657

(51) Int. Cl.
*H02J 9/06*  (2006.01)
*H02J 3/32*  (2006.01)
*H02J 3/38*  (2006.01)

(52) U.S. Cl.
CPC .............. *H02J 9/063* (2020.01); *H02J 3/32* (2013.01); *H02J 3/38* (2013.01)

(58) Field of Classification Search
CPC .............. H02J 9/063; H02J 3/32; H02J 3/38
See application file for complete search history.

(56) References Cited

U.S. PATENT DOCUMENTS 9,559,607 B1    1/2017  Wang et al.
2011/0278933 A1  11/2011  Anderson et al.
(Continued)

FOREIGN PATENT DOCUMENTS

CN    106030952 A    10/2016
CN    106067695 A    11/2016
(Continued)

OTHER PUBLICATIONS

Korean Notice of Allowance for related Korean Application No. 10-2019-0109657; action dated Aug. 4, 2021; (3 pages).
(Continued)

*Primary Examiner* — Daniel Cavallari
(74) *Attorney, Agent, or Firm* — K&L Gates LLP

(57) ABSTRACT

The present specification relates to a power supply device and a power supply system capable of uninterrupted power supply, which includes a circuit breaker for regulating connection to a power bus to which a plurality of power supply devices are connected, wherein the circuit breaker is opened or closed according to various situations occurring in the system so as to control power supply and demand.

10 Claims, 8 Drawing Sheets

(56) References Cited

U.S. PATENT DOCUMENTS

| | | |
|---|---|---|
| 2012/0181990 A1 | 7/2012 | Asakura et al. |
| 2017/0358929 A1 | 12/2017 | Koeppe et al. |
| 2018/0083494 A1 | 3/2018 | Noguchi et al. |
| 2018/0131226 A1* | 5/2018 | Narla ............... H02S 40/38 |

FOREIGN PATENT DOCUMENTS

| | | |
|---|---|---|
| CN | 207283251 U | 4/2018 |
| EP | 2654157 A1 | 10/2013 |
| EP | 2442417 B1 | 3/2016 |
| JP | H11103539 A | 4/1999 |
| JP | H11266532 A | 9/1999 |
| JP | 2013223425 A | 10/2013 |
| JP | 2014504492 A | 2/2014 |
| JP | 2014505457 A | 2/2014 |
| JP | 2014176163 A | 9/2014 |
| JP | 2016103973 A | 6/2016 |
| JP | 2017184366 A | 10/2017 |
| KR | 101223260 B1 | 1/2013 |
| KR | 101336042 B1 | 12/2013 |
| KR | 20140123982 A | 10/2014 |
| WO | 2015003042 A1 | 1/2015 |
| WO | 2015072304 A1 | 5/2015 |
| WO | 2015199718 A1 | 12/2015 |

OTHER PUBLICATIONS

International Search Report for related International Application No. PCT/KR2019/011668; report dated Mar. 19, 2020; (5 pages).

Written Opinion for related International Application No. PCT/KR2019/011668; report dated Mar. 19, 2020; (5 pages).

Korean Office Action for related Korean Application No. 10-2019-0109657; action dated Dec. 9, 2020; (6 pages).

Japanese Notice of Allowance for related Japanese Application No. 2021-513220; action dated Apr. 19, 2022; (3 pages).

Extended Search Report for related European Application No. 19859666.0; action dated Apr. 21, 2022; (6 pages).

Office Action for related Chinese Application No. 201980059984.1; action dated Mar. 28, 2024; (7 pages).

* cited by examiner

POWER SUPPLY DEVICE AND POWER SUPPLY SYSTEM

CROSS-REFERENCE TO RELATED APPLICATIONS

This application is the National Stage filing under 35 U.S.C. 371 of International Application No. PCT/KR2019/0011668, filed on Sep. 10, 2019, which claims the benefit of earlier filing date and right of priority to Korean Application No. 10-2018-0109528, filed on Sep. 13, 2018, and Korean Application No. 10-2019-0109657, filed Sep. 4, 2019, the contents of which are all hereby incorporated by reference herein in their entirety.

FIELD

The present disclosure relates to a power supply device and a power supply system which enable uninterruptible power supply.

BACKGROUND

A technology that is the background of the present disclosure relates to a system including a plurality of power supply devices.

A system in which a plurality of power supply devices supply power to each load may be connected in common through a DC bus line. When connected to a common bus line as described above, there is an advantage capable of receiving and supplying power from and to an adjacent power device through the DC bus line. However, when the system is configured in this way, there are limitations such as system stability problem, difficulty in controlling power demand and supply, and a lack of countermeasures in case of an accident.

Since a large number of power devices having a complex configuration are provided, system operation cannot be stably carried out when compatibility between devices is poor. Furthermore, when a load to which each device supplies power is a critical load that needs power supply at all times, it is required to provide a separate UPS device for an abnormal condition, but when a UPS device is provided, the configuration of the system becomes more complicated, and the provision of the UPS device itself is not easy due to structural/design constraints. In addition, as the configuration becomes more complicated, the control of each device and system is inevitably more complex, and the risk of occurrence of failures and accidents increases. As a result, it is difficult to supply stable and reliable power, so the operation of the load is also unstable, and an appropriate operational response to the occurrence of various accidents cannot be made.

SUMMARY

The present disclosure aims at overcoming the limitations of the related art.

That is, one aspect of the present disclosure is to provide a power supply device and a power supply system, capable of overcoming the limitations of the related art.

Specifically, an aspect of the present disclosure is to provide a power supply device and a power supply system, capable of allowing power reception and power supply among a plurality of power supply devices provided in a system, so as to enable a UPS function among the plurality of power supply devices.

Another aspect of the present disclosure is to provide a power supply device and a power supply system, capable of effectively maintaining power supply to loads in various abnormal situations.

Another aspect of the present disclosure is to provide a power supply device and a power supply system, capable of performing power reception and power supply appropriately and stably, in response to various abnormal situations.

In order to overcome those aspects of the present disclosure, a power supply device and a power supply system according to an embodiment may be configured to control reception and supply of power by opening and closing circuit breakers, which control connection and disconnection between a plurality of power supply devices and a bus line, according to various situations occurred on the system.

That is, a power supply device and a power supply system according to the present disclosure may be configured to supply and receive power through a bus line by controlling circuit breakers which are provided to correspond to a plurality of power supply devices, thereby enabling a UPS function among the plurality of power supply devices.

The technical features may be applied to a power supply device and a power supply system, and this specification provides embodiments of the power supply device and the power supply system having the technical features.

An embodiment of a power supply device according to the present disclosure to achieve those technical features may include a plurality of first power conversion devices to convert power supplied from a plurality of power supply sources, respectively, into DC power, at least one second power conversion device to convert the DC power into driving power to supply the driving power to a load, a first circuit breaker disposed between a power end, to which first output ends of the plurality of first power conversion devices connected to opening and closing mechanisms for controlling an output of the DC power and an input end of the second power conversion device are connected, and a bus line connected to the power end so that the DC power flows, and a second circuit breaker disposed between a second output end of any one of the plurality of first power conversion devices and the bus line. The first circuit breaker may be opened or closed depending on a state of at least one of the DC power, the driving power, the plurality of first power conversion devices, and the load, so as to connect or disconnect the DC power between the power end and the bus line. The second circuit breaker may be opened or closed depending on a state of at least one of the DC power, the driving power, the plurality of first power conversion devices, and the load, so as to connect or disconnect the DC power between the second output end and the bus line.

In one embodiment of the power supply device, the plurality of power supply sources may include a first Alternating-Current (AC) power source and a second AC power source to supply AC power.

In one embodiment of the power supply device, the plurality of power supply sources may further include a battery to store DC power therein. The DC power stored in the battery may be supplied to the first power conversion devices while the supply of the DC power is restored in a case where the supply of the DC power to the second power conversion device is interrupted.

In one embodiment of the power supply device, the case where the supply of the DC power is interrupted may correspond to at least one of a case where power supply of the first AC power source and the second AC power source is interrupted, and a case where operations of the plurality of first power conversion devices receiving power from the first AC power source and the second AC power source are stopped.

In one embodiment of the power supply device, the battery may uninterruptibly supply the stored power to the plurality of first power conversion devices until the supply of the DC power is restored in a switching manner after the supply of the DC power is interrupted.

In one embodiment of the power supply device, the plurality of first power conversion devices may include first to third conversion devices connected to the first AC power source, the battery, and the second AC power source, respectively, to receive power from the connected power supply sources.

In one embodiment of the power supply device, the plurality of first power conversion devices may supply the DC power to the second power conversion device as one of the first to third conversion devices operates.

In one embodiment of the power supply device, the plurality of first power conversion devices may be configured such that, in a case where power supply of any one conversion device that supplies the DC power to the second power conversion device is interrupted, the DC power is supplied to the second power conversion device through another conversion device other than the one conversion device.

In one embodiment of the power supply device, the case where the power supply of the one conversion device is interrupted may correspond to a case where fault conditions have occurred in at least one of the one conversion device, a power supply source connected to the one conversion device, and a rating of the DC power.

In one embodiment of the power supply device, the plurality of first power conversion devices may be configured such that the DC power is supplied to the second power conversion device through the second conversion device while the one conversion device is switched to the another conversion device.

In one embodiment of the power supply device, the state of the at least one may correspond to at least one of a case where the DC power is changed from an initial state, a case where the driving power is changed from an initial state, a case where operating states of the plurality of first power conversion devices is changed, and a case where a driving state of the load is changed.

In one embodiment of the power supply device, the first circuit breaker may be closed when connecting the DC power between the power end and the bus line, and opened when disconnecting the DC power between the power end and the bus line.

In one embodiment of the power supply device, the first circuit breaker may be closed to connect the power end and the bus line such that the DC power is allowed to flow from the bus line to the power end so as to be supplied to the second power conversion device, when the power supply of conversion devices connected to the first AC power source and the second AC power source is interrupted.

In one embodiment of the power supply device, a conversion device connected to the battery may supply the DC power to the second power conversion device until the DC power is supplied to the second power conversion device through the bus line after the power supply of the conversion devices connected to the first AC power source and the second AC power source is interrupted.

In one embodiment of the power supply device, the first circuit breaker may be closed only when the second circuit breaker is opened.

In one embodiment of the power supply device, the second circuit breaker may be closed when connecting the DC power between the second output end and the bus line, and opened when disconnecting the DC power between the second output end and the bus line.

In one embodiment of the power supply device, the second circuit breaker may be closed to connect the second output end and the bus line such that the DC power is allowed to flow from the second output end to the bus line so as to be supplied to another power supply device, when power supply of the another power supply device connected to the bus line is interrupted.

In one embodiment of the power supply device, the second circuit breaker may be closed only when an opening and closing mechanism connected to the second circuit breaker and the first circuit breaker are opened.

In one embodiment of the power supply device, the power supply device may further include a control unit to control the plurality of first power conversion devices, the second power conversion device, and the first and second circuit breakers, monitor a state of at least one of the plurality of power supply sources, the plurality of first power conversion devices, the DC power, the driving power, and the load, and control the first and second circuit breakers to connect the power end or the second output end to the bus line according to a result of the monitoring.

Also, another embodiment of a power supply device according to the present disclosure to achieve those technical features may include a plurality of converters to convert power supplied from each of a plurality of power supply sources into DC power, at least one second power conversion device to convert the DC power into driving power for driving a plurality of loads to supply the driving power to the plurality of loads, a first circuit breaker provided between a first output end commonly connected with outputs of the plurality of converters and a bus line connected to the first output end, to control connection and disconnection between the first output end and the bus line, a second circuit breaker provided between a second output end as an output of one of the plurality of converters and the bus line connected to the second output end to control connection and disconnection between the second output end and the bus line, and a control unit to control opening and closing of the first and second circuit breakers according to a state of the DC power or the driving power so as to control reception and supply of the DC power through the bus line.

In one embodiment of the power supply device, the control unit may select any one of the plurality of converters according to states of the plurality of power supply sources, such that the DC power is transferred to the second power conversion device through the selected converter.

In one embodiment of the power supply device, when a fault has occurred in at least one of any one converter which is transferring the DC power to the second power conversion device and a power supply source corresponding to the converter, the control unit may control the DC power to be transferred to the second power conversion device through another converter other than the one converter.

In one embodiment of the power supply device, when fault conditions have occurred in the plurality of power supply sources, the control unit may close the first circuit breaker to receive the DC power from another power supply device, which is connected to the bus line, through the bus line.

In one embodiment of the power supply device, when a fault has occurred in another power supply device connected to the bus, the control unit may close the second circuit breaker, such that the DC power is supplied from a converter connected to the second circuit breaker to the another power supply device through the bus line.

An embodiment of a power supply system according to the present disclosure to achieve those technical features may include a plurality of power panels to convert power supplied from each of a plurality of power supply sources into DC power, convert the DC power into driving power of a load, and supply the driving power to the load, a bus line connected to power ends through which the DC power is input from the plurality of power panels, and second output ends separately provided from the power ends to output the DC power, such that the DC power converted in the plurality of power panels flows therethrough, a plurality of first circuit breakers disposed between the power ends and the bus line, respectively, and a plurality of second circuit breakers disposed between the second output ends and the bus line, respectively. The plurality of first circuit breakers may be opened or closed depending on an operating state of at least one of the plurality of power panels, so as to connect or disconnect the DC power between the power ends and the bus line. The plurality of second circuit breakers may be opened or closed depending on an operating state of at least one of the plurality of power panels, so as to connect or disconnect the DC power between the second output ends and the bus line.

In one embodiment of the power supply system, the plurality of power supply sources may include first and second AC power sources supplying AC power, and a battery power source storing DC power to supply the stored power to the plurality of power panels while power supply is restored in a switching manner when the power supply of the first and the second AC power sources is interrupted.

In one embodiment of the power supply system, the battery power source may uninterruptibly supply the stored power to the plurality of power panels until the interrupted power supply is restored in the switching manner.

In one embodiment of the power supply system, the plurality of power supply sources may further include an emergency power source configured to supply emergency power to the load when the power supply of the first AC power source, the second AC power source, and the battery power source is interrupted.

In one embodiment of the power supply system, each of the plurality of power panels may include a plurality of first power conversion devices to convert power supplied from the plurality of power supply sources, respectively, into the DC power, and a second power conversion device to convert the DC power supplied from the plurality of first power conversion devices into the driving power and supply the driving power to the load.

In one embodiment of the power supply system, the plurality of power panels may be configured such that the DC power is supplied to the second power conversion device through any one of the plurality of first power conversion devices according to states of the plurality of power supply sources.

In one embodiment of the power supply system, the plurality of power panels may be configured such that, in a case where power supply of any one conversion device that supplies the DC power to the second power conversion device is interrupted, the DC power is supplied to the second power conversion device through another conversion device other than the one conversion device.

In one embodiment of the power supply system, the plurality of first power conversion devices may be configured such that the DC power is supplied to the second power conversion device through a conversion device which receives power from the battery power source, while the one conversion device is switched to the another conversion device.

In one embodiment of the power supply system, the plurality of first circuit breakers may be closed when connecting the DC power between the power ends and the bus line, and opened when disconnecting the DC power between the power ends and the bus line, and the plurality of second circuit breakers may be closed when connecting the DC power between the second output ends and the bus line, and opened when disconnecting the DC power between the second output ends and the bus line.

In one embodiment of the power supply system, the plurality of first and second circuit breakers may be configured such that a first circuit breaker of one power panel interrupted in power supply and a second circuit breaker of a power panel adjacent to the interrupted power panel are closed to connect the interrupted power panel and the adjacent power panel to the bus line so as to supply the DC power from the adjacent power panel to the interrupted power panel through the bus line, when the power supply of the one power panel of the plurality of power panels is interrupted.

In one embodiment of the power supply system, the interrupted power panel may be configured such that the DC power is supplied through a conversion device connected to the battery power source until the DC power is supplied through the adjacent power panel after the power supply is interrupted.

In one embodiment of the power supply system, the adjacent power panel may be a power panel which is adjacent to the interrupted power panel and in which a conversion device outputting the DC power to the second output end is not operating.

In one embodiment of the power supply system, the power supply system may further include a control device to monitor a state of at least one of the plurality of power panels and the plurality of first and second circuit breakers, and control at least one of the plurality of power panels and the plurality of first and second circuit breakers according to a result of the monitoring.

Also, another embodiment of a power supply system according to the present disclosure to achieve those technical features may include a plurality of loads, a plurality of power panels to convert power supplied from each of a plurality of power supply sources into DC power, convert the DC power into driving power for driving the plurality of loads, and supply the driving power to the plurality of loads, a bus line connected commonly with output ends through which the DC power is output from the plurality of power panels, respectively, so as to receive the DC power converted in each of the plurality of power panels, a plurality of first circuit breakers provided on electric circuits, to which first output ends, commonly connected with the output of the DC power among the output ends, and the bus line are connected, to control connection and disconnection between the first output ends and the bus line, a plurality of second circuit breakers provided on electric circuits to which second output ends separately provided to output the DC power, among the output ends, and the bus line are connected, to control connection and disconnection between the second output ends and the bus line, and a control device to control opening and closing of the plurality of first and second circuit breakers according to states of the plurality of power panels, to control reception and supply of the DC power among the plurality of power panels through the bus line.

In one embodiment of the power supply system, the plurality of power panels may select any one of a plurality of converters according to states of the plurality of power supply sources, such that the DC power is transferred to a second power conversion device, which converts the driving power, through the selected converter.

In one embodiment of the power supply system, when a fault has occurred in at least one of one converter which is transferring the DC power to a second power conversion device, which converts the DC power, into the driving power, and a power supply source corresponding to the one converter, the plurality of power panels may transfer the DC power to the second power conversion device through another converter other than the one converter.

In one embodiment of the power supply system, when a fault has occurred in at least one of the plurality of power supply panels, the control device may close a first circuit breaker of a power panel in which the fault has occurred and another power panel closest to the fault-occurred power panel, such that the fault-occurred power panel receives the DC power from the adjacent power panel through the bus line.

The power supply device and the power supply system according to the present disclosure may be applied to a power supply device that supplies and uses DC power, a power supply system, a method for operating the power supply system, in particular, may be usefully applied to a DC UPS module and a power supply system having the same. However, the technology disclosed in this specification is not limited thereto, and may also be applied to all of a power source device, a power supply device, a power control device, a power supply system, a power system, a power control system, a plant system, a plant control system, a plant control method, an energy storage system, a method of controlling or operating an energy storage system, a motor control panel for controlling a plurality of motor loads, a motor control system, a motor operation system, and the like, to which the technical features of the technology can be applied.

Advantageous Effects

In a power supply device and a power supply system according to the present disclosure, power supply and power reception through a bus line can be made by controlling circuit breakers of a plurality of power supply devices connected to the bus line, which may result in performing a UPS function among the plurality of power supply devices.

Accordingly, even if various abnormal situations occur on the system, power supply to loads can be maintained without interruption.

That is, the power supply device and the power supply system according to the present disclosure have an effect of achieving appropriate and stable power supply, in response to various abnormal situations occurring on the system.

In the power supply device and the power supply system according to the present disclosure, the reception and supply of power through the bus line can be made by controlling the circuit breakers of the plurality of power supply devices connected to the bus line according to occurred situations, thereby allowing an efficient operation with the least elements.

The power supply device and the power supply system according to the present disclosure have an effect of increasing stability, reliability, and effectiveness of an operation of a large-capacity system.

Accordingly, the power supply device and the power supply system according to the present disclosure can achieve those aforementioned aspects and other advantages, thereby overcoming the limitations of the related art.

DETAILED DESCRIPTION

Figure 1:
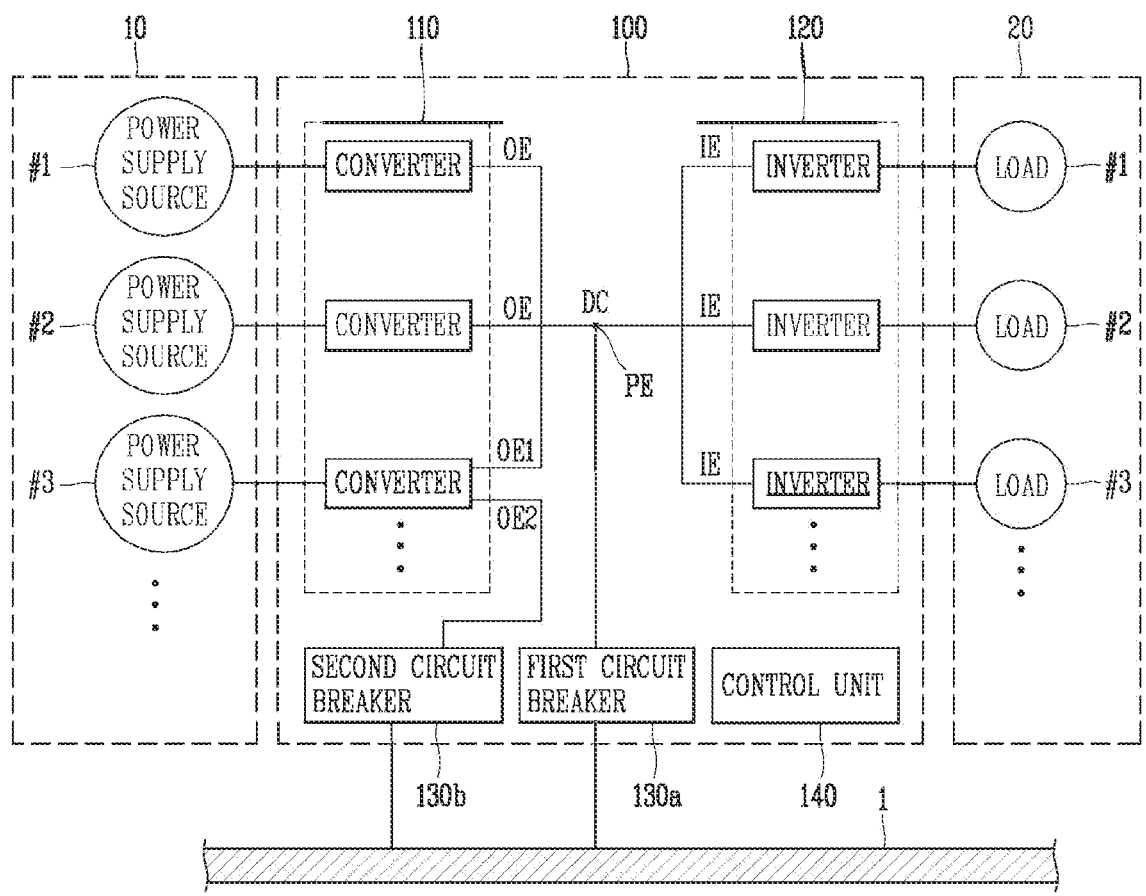
FIG. 1 is a diagram illustrating a configuration of a power supply device in accordance with the present disclosure.

It is noted that the technical terms used herein are used only to describe specific embodiments and are not intended to limit the scope of the technology disclosed herein. Also, unless particularly defined otherwise, technological terms used herein should be construed as a meaning that is generally understood by those having ordinary skill in the art to which this specification pertains, and should not be construed too broadly or too narrowly. Furthermore, if technological terms used herein are wrong terms unable to correctly express the idea of the technology disclosed in this specification, then they should be replaced by technological terms that are properly understood by those skilled in the art. In addition, general terms used herein should be construed based on the definition of dictionary, or the context, and should not be construed too broadly or too narrowly.

A singular representation used herein may include a plural representation unless it represents a definitely different meaning from the context. In this specification, the terms "comprising" and "including" should not be construed to necessarily include all of the elements or steps disclosed herein, and should be construed not to include some of the elements or steps thereof, or should be construed to further include additional elements or steps.

Hereinafter, embodiments of the present disclosure will be described in detail with reference to the accompanying drawings, and the same reference numerals are used to designate the same/like components and redundant description thereof will be omitted.

In describing the technology disclosed in this specification, if a detailed explanation for a related known function or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Hereinafter, a power supply device according to the present disclosure will be described.

An embodiment of a power supply device to be described below may be implemented independently or in combination with an embodiment of a power supply system to be described below.

The power supply device may be implemented independently in embodiments to be described below or in combination of those embodiments.

The power supply device may be a module including a plurality of power control devices.

The power supply device may be a power device in which the plurality of power control devices is packaged.

For example, the plurality of power control devices may be a packaged power panel.

The power supply device may be a package type power panel provided in buildings requiring high power, such as power plants, plants, factories, apartments, etc.

The power supply device may also be a package type power panel configured in any one space.

The power supply device may include the plurality of power control devices that are packaged to supply power to a load.

The power supply device 100 (hereinafter, referred to as a supply device), as illustrated in FIG. 1, may include a plurality of first power conversion devices 110 that converts power supplied from each of a plurality of power supply sources 10 into DC power, at least one second power conversion device 120 that converts the DC power into driving power to supply the driving power to loads 20, a first circuit breaker 130a disposed between a power end, to which first output ends of the plurality of first power conversion devices 110 connected to opening and closing mechanisms for controlling an output of the DC power and an input end of the second power conversion device 120 are connected, and a bus line 1 connected to the power end such that the DC power can flow therethrough, and a second circuit breaker 130b disposed between a second output end of one of the plurality of first power conversion devices 110 and the bus line 1.

In the supply device 100, the first circuit breaker 130a may be opened or closed depending on a state of at least one of the DC power, the driving power, the plurality of first power conversion devices 110, and the loads 20, to connect or disconnect (supply or cut off) the DC power between the power end and the bus line 1. The second circuit breaker 130b may be opened or closed depending on a state of at least one of the DC power, the driving power, the plurality of first power conversion devices 110, and the loads 20, to connect or disconnect the DC power between the second output end and the bus line 1.

As such, the supply device 100 may include the plurality of first power conversion devices 110, the second power conversion device 120, and the first and second circuit breakers 130a and 130b, so as to convert power supplied from the plurality of power supply sources 10 into the driving power. Accordingly, the driving power may be supplied to the loads 20.

Figure 2:
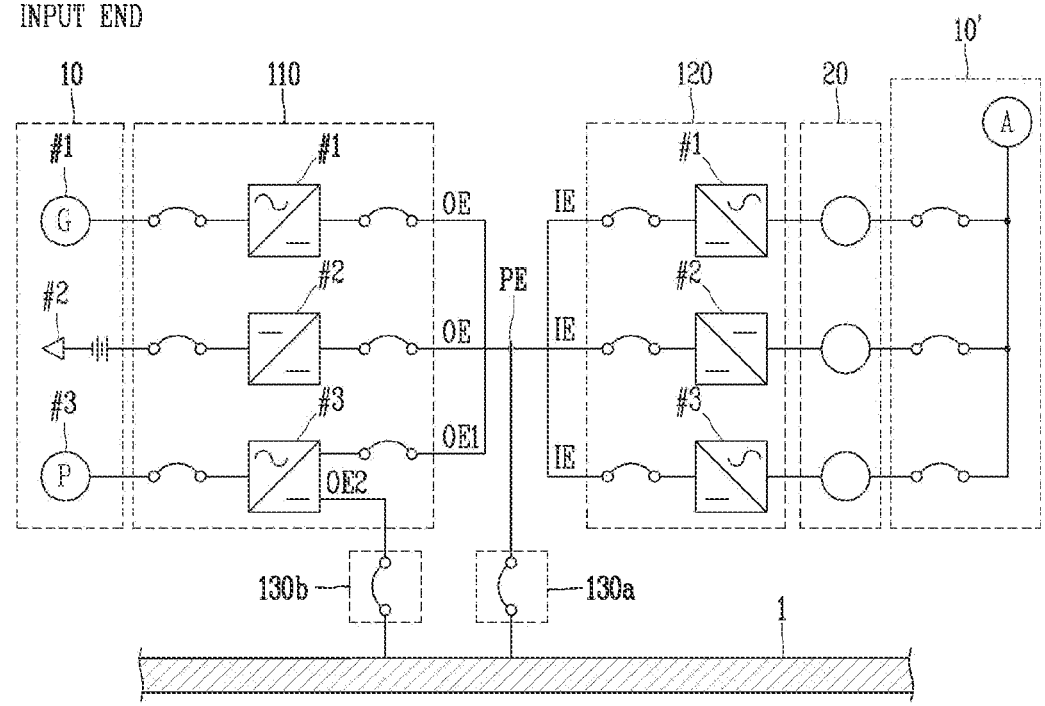
FIG. 2 is a diagram illustrating a detailed circuit configuration of a power supply device in accordance with the present disclosure.
Figure 3:
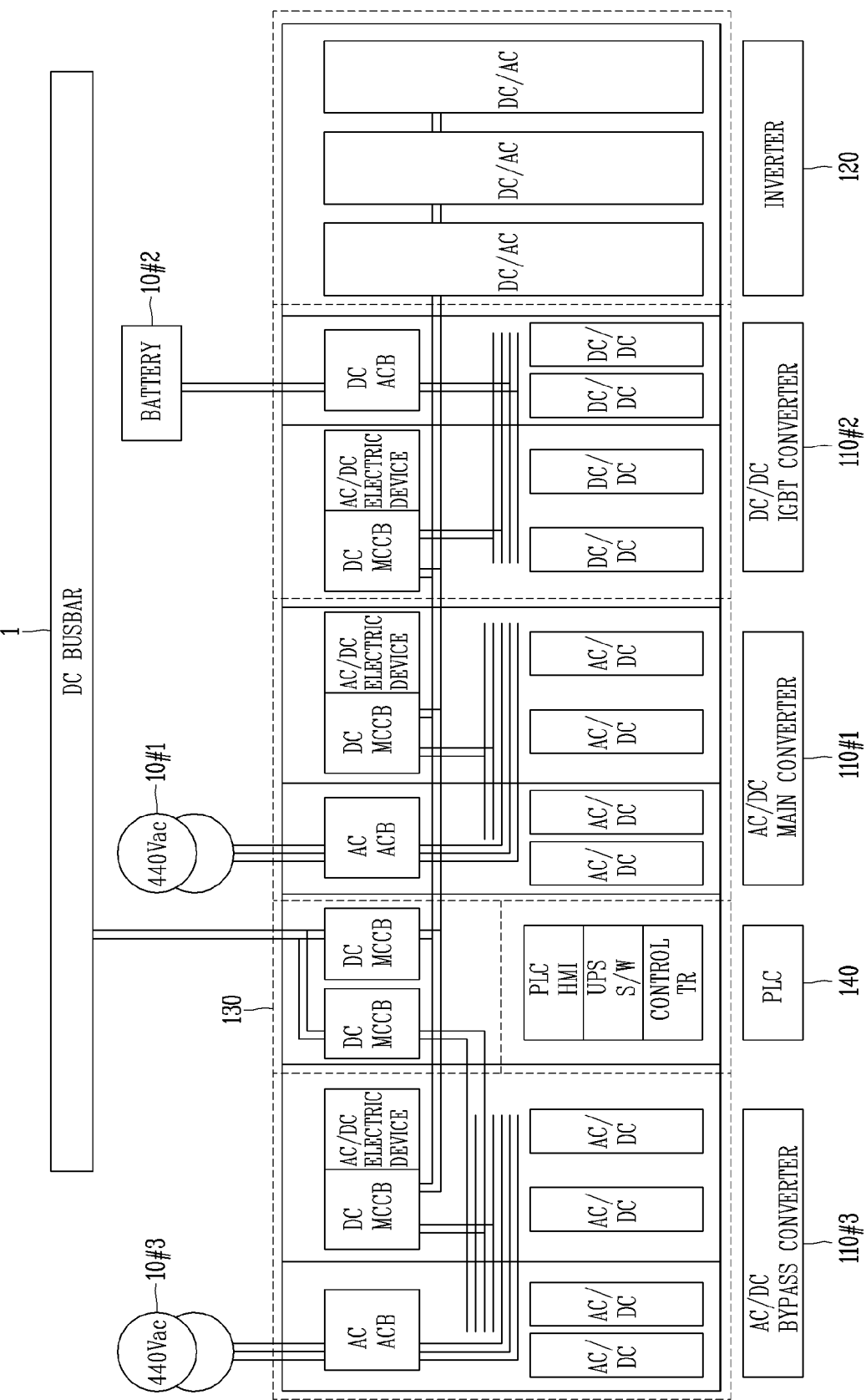
FIG. 3 is a diagram illustrating a detailed structure of a power supply device in accordance with the present disclosure.

A detailed configuration of the supply device 100 including the plurality of first power conversion devices 110, the second power conversion device 120, and the first and second circuit breakers 130a and 130b may be as shown in FIGS. 2 and 3.

The plurality of power supply sources 10 supplying power to the supply device 100 may be externally connected to the plurality of first power conversion devices 110, respectively, to supply power to the respective first power conversion devices 110.

The plurality of power supply sources 10 may be connected to the plurality of first power conversion devices 110, respectively, to supply DC or AC power to the respective first power conversion devices 110.

The plurality of power supply sources 10 may include different power sources.

The plurality of power supply sources 10 may include a first AC power source 10 #1 and a second AC power source 10 #3 each supplying AC power, as shown in FIGS. 2 and 3.

The plurality of power supply sources 10 may further include a battery 10 #2 storing DC power.

The plurality of power supply sources 10, as illustrated in FIGS. 2 and 3, may preferably include three different power sources 10 #1 to 10 #3. The three different power sources 10 #1 to 10 #3 may be the first AC power source 10 #1 for supplying AC power, the battery 10 #2 for storing DC power, and the second AC power source 10 #3 for supplying AC power.

Accordingly, the supply device 100 may receive at least two AC power and at least one DC power.

The first AC power source 10 #1 may be a system power source G.

The first AC power source 10 #1 may be a system power source G for supplying AC power of 440 [V].

The second AC power source 10 #3 may be a bypass power source P.

The second AC power source 10 #3 may be a bypass power source P for supplying AC power of 440 [V].

The battery 10 #2 may be an emergency battery for storing DC power to supply the stored DC power in an emergency.

The battery 10 #2 may supply the stored DC power to the supply device 100 when fault conditions have occurred in the first AC power source and the second AC power source.

Accordingly, when the supply of the DC power to the second power conversion device 120 is interrupted (stopped) in the plurality of power supply sources 10, the power stored in the battery 10 #2 may be supplied to the first power conversion device 110 while the supply of the DC power is restored.

Here, the case where the supply of the DC power is interrupted may be at least one of a case where the power supply of the first AC power source 10 #1 and the second AC power source 10 #3 is interrupted, and a case where operations of the plurality of first power conversion devices 110 which receives power from the first AC power source 10 #1 and the second AC power source 10 #3 are stopped.

After the supply of the DC power is interrupted, the battery 10 #2 may uninterruptibly supply the stored power to the first power conversion devices 110 until the supply of the DC power is restored in a switching manner.

The uninterruptible supply means that the stored power is supplied to the first power conversion devices 110 without interrupting power supply, namely, without a power failure.

Accordingly, the supply device 100 can supply power uninterruptibly to the loads 20 through the battery 10 #2 and allow the uninterruptible power supply to the loads 20.

The first power conversion device 110 may be provided in plurality.

The first power conversion device 110, which is a device that converts supplied power into DC power, may be a converter, for example.

The first power conversion device 110 may be an AC/DC converter that converts AC power to DC power, or a DC/DC converter that converts DC power to DC power.

The plurality of first power conversion devices 110 may include at least one of an AC/DC converter for converting AC power to DC power and a DC/DC converter for converting a level of DC power.

The plurality of first power conversion devices 110 may include first to third conversion devices 110 #1 to 110 #3 connected to the first AC power source 10 #1, the battery 10 #2, and the second AC power source 10 #3, respectively, to receive power.

The plurality of first power conversion devices 110 may include three conversion devices 110 #1 to 110 #3 corresponding to the plurality of power supply sources 10, respectively.

Accordingly, the first AC power source 10 #1 may be connected to the first conversion device 110 #1 to supply AC power to the first conversion device 110 #1, the battery 10 #2 may be connected to the second conversion device 110 #2 to supply DC power to the second conversion device 110 #2, and the second AC power source 10 #3 may be connected to the third conversion device 110 #3 to supply AC power to the third conversion device 110 #3.

The first conversion device 110 #1 may be an AC/DC conversion device for converting AC power into DC power, the second conversion device 110 #2 may be a DC/DC conversion device for converting a level of DC power, and the third conversion device 110 #3 may be an AC/DC conversion device for converting AC power into DC power.

The plurality of first power conversion devices 110 may include opening and closing mechanisms provided on front and rear ends for opening or closing the front and rear ends.

The opening and closing mechanisms may be switches which is be provided on an input end and the first output end of each of the plurality of first power conversion devices 110, to control input and output of power to and from the plurality of first power conversion devices 110.

Here, the opening and closing mechanism provided on the input end may be a circuit breaker that breaks a circuit when detecting an overcurrent.

More specifically, Air Circuit Breakers (ACBs) may be provided on the input ends of the first conversion device 110 #1 and the third conversion device 110 #, to which AC power is supplied from the first AC power source 10 #1 and the second AC power source 10 #3. A Molded Circuit Breaker (MCCB) may be provided on the input end of the second conversion device 110 #2, to which DC power is supplied from the battery 10 #2.

The opening and closing mechanisms may connect or disconnect the plurality of first power conversion devices 110 according to the operations of the plurality of first power conversion devices 110.

For example, when power is not supplied from the plurality of power supply sources 10, the opening and closing mechanisms provided on the input ends and output ends may be open so as to disconnect the first power conversion devices 110.

The plurality of first power conversion devices 110 may output the DC power through the first output end and the second output end which are separately provided.

That is, the plurality of first power conversion devices 110 may be provided with the first output end and the second output end separately, so as to output the DC power through the output ends.

The first output end may be an electric circuit to which the output ends of the plurality of first power conversion devices 110 are connected, respectively.

Accordingly, the first output end may be an electric circuit, to which the output ends of the plurality of first power conversion devices 110 are commonly connected such that the DC power output from the plurality of first power conversion devices 110 can flow.

The DC power which is output from one of the plurality of first power conversion devices 110 may flow along the first output end.

The first output end may be connected to the bus line 1 and an input end of the second power conversion device 120, such that the DC power can be transferred to the bus line 1 or the second power conversion device 120.

The second output end may be an output end of any one of the plurality of first power conversion devices 110, without being connected to the first output end.

Accordingly, the second output end may be an electric circuit which is separately provided from the first output end and along which the DC power output from any one of the plurality of first power conversion devices 110 flows.

The second output end may be connected to the bus line 1 to output the DC power to the bus line 1.

The second output end may preferably be an output end of the third conversion device 110 #3 corresponding to the third power supply source 10 #3.

According to this, the second output end may be an output end of the third conversion device 110 #3, to which power is supplied from the bypass power source P as the third power supply source 10 #3.

That is, the third conversion device 110 #3 may be configured such that the output of the DC power is divided into two paths, namely, the first output end and the second output end. The first output end may be commonly connected to the first output ends of the first and second conversion devices 110 #1 and 110 #2 and the second output end may be separated from the first output ends so as to output the DC power independently.

As such, the first output end and the second output end through which the DC power is output from the plurality of first power conversion devices 110 may be connected to the bus line 1.

That is, the first output end may be connected to the bus line 1 and the input end of the second power conversion device 120, to output the DC power to the bus line 1 and the second power conversion device 120, respectively, and the second output end may be connected to the bus line 1 to output the DC power to the bus line 1.

The DC power that has been output by being converted in the plurality of first power conversion devices 110 may be transferred to the second power conversion device 120.

The plurality of first power conversion devices 110 may be configured such that one of first to third conversion devices 110 #1 to 110 #3 is operated to supply the DC power to the second power conversion device 120.

When the power supply of one conversion device 110 #1, 110 #2, 110 #3 which supplies the DC power to the second power conversion device 120 is interrupted in the supply device 100, the plurality of first power conversion devices 110 may supply the DC power to the second power conversion device 120 through another conversion device other than the one conversion device.

Here, the case where the power supply of the one conversion device 110 #1, 110 #2, 110 #3 is interrupted may be a case where an abnormal condition (fault condition or state) is detected in at least one of a power supply source connected to the one conversion device and a rating of the DC power.

For example, while the first conversion device 110 #1 connected to the first AC power source 10 #1 supplies the DC power to the second power conversion device 120, when the rating of the DC power output from the first conversion device 110 #1 is reduced below a predetermined reference, the second conversion device 110 #2, which is different from the first conversion device 110 #1, may supply the DC power to the second power conversion device 120.

In this case, the plurality of first power conversion devices 110 may be configured such that the DC power is supplied to the second power conversion device 120 through the second conversion device 110 #2 connected to the battery 10 #2, while the one conversion device is switched to the another conversion device.

That is, when the supply of the DC power to the second power conversion device 120 is interrupted, the second conversion device 110 #2 connected to the battery 10 #2 may supply the DC power to the second power conversion device 120 until the supply of the DC power is restored in a switching manner.

The second power conversion device 120 may be provided in plurality.

The second power conversion device 120 is a device that converts supplied DC power into the driving power, and may be, for example, an inverter.

The second power conversion device 120 may be an inverter that converts DC power received from the first power conversion device 110 into AC driving power when the load is a load driven by AC power.

The second power conversion device 120 may be an inverter that converts DC power received from the first power conversion device 110 into DC driving power when the load is a load driven by DC power.

The second power conversion device 120 may be provided as many as the number of the load 20.

The load 20 may be provided in plurality.

The second power conversion device 120 may include at least three inverters 120 #1 to 120 #3 corresponding to the loads 20, respectively.

The second power conversion devices 120 may be connected to the loads 20, respectively, to supply the driving power to the connected loads.

Each of the second power conversion devices 120 may include an opening and closing mechanism provided on a front end for opening and closing the front end.

The opening and closing mechanism may be a switch which is provided on an input end of each of the second conversion devices 120 to control power input to the second power conversion device 120.

Here, the opening and closing mechanism provided on the input end may be a circuit breaker that breaks a circuit when detecting an overcurrent.

The driving power converted and output by the second power conversion devices 120 may be transferred to the loads 20, respectively.

Here, the load 20 may be a load of an electric motor M.

The first and second circuit breakers 130a and 130b may be DC circuit breakers that cut off DC power.

The first circuit breaker 130a of the first and second circuit breakers 130a and 130b may be provided between the power end connected to the first output ends of the plurality of power conversion devices 110, respectively, and the bus line 1 connected to the power end.

That is, the first circuit breaker 130a may be provided between the power end of the supply device 100 and the bus line 1, to control connection and disconnection between the supply device 100 and the bus line 1.

According to this, the supply device 100 may be connected to the bus line 1 through the power end and connected to or disconnected from the bus line 1 by closing or opening the first circuit breaker 130a.

The second circuit breaker 130b of the first and second circuit breakers 130b and 130b may be provided between the second output end of one of the plurality of power conversion devices 110 and the bus line 1 connected to the second output end.

That is, the second circuit breaker 130b may be provided between the second output end of the supply device 100 and the bus line 1, to control connection and disconnection between the supply device 100 and the bus line 1.

According to this, the supply device 100 may be connected to the bus line 1 through the second output end, and connected to or disconnected from the bus line 1 by closing or opening the second circuit breaker 130b.

The bus line 1 may be a DC bus line through which DC power flows.

The bus line 1 may indicate a DC-only electric circuit to which a plurality of power supply sources is commonly connected to output power.

The bus line 1 may be connected to a plurality of DC power supply sources, to output DC power supplied from the plurality of DC power supply sources.

For example, the bus line 1 may be connected to another power supply device other than the supply device 100 to allow the transfer of DC power between the supply device 100 and the another power supply device.

The bus line 1 may have a rating of a magnitude of DC power supplied from at least one first conversion device 110 to a magnitude of DC power supplied from two first conversion devices 110.

That is, the rating of the bus line 1 may be a rating at which DC power supplied from at least two first conversion devices 110 can be transferred.

The bus line 1 may preferably have a rating of a magnitude which allows the transfer of DC power among all of the power panels connected to the bus line 1.

DC power may flow through the bus line 1 as the first and second circuit breakers 130a and 130b are opened or closed.

The DC power may be transferred through the bus line 1 as the first and second circuit breakers 130a and 130b are opened or closed.

The first and second circuit breakers 130a and 130b which are provided between the bus line 1 and the power end and the second output end to control the connection and disconnection between the bus line 1 and the power end and the second output end.

The first and second circuit breakers 130a and 130b may be configured to control the connection to or disconnection from the bus line 1.

The first circuit breaker 130a may be opened or closed depending on a state of at least one of the DC power, the driving power, the plurality of first power conversion devices 110, and the loads 20, such that the DC power can be supplied or cut off between the power end and the bus line 1.

The second circuit breaker 130b may be opened or closed depending on a state of at least one of the DC power, the driving power, the plurality of first power conversion devices 110, and the loads 20, such that the DC power can be supplied or cut off between the second output end and the bus line 1.

Here, the state of the at least one may correspond to at least one of a case where the DC power is changed from an initial state, a case where the driving power is changed from an initial state, a case where operating states of the plurality of the first power conversion devices 110 are changed, and a case where operating states of the loads 20 are changed.

For example, the state of the at least one may correspond to a case where the DC power or the driving power falls below a reference rating, a case where the operating states of the plurality of first power conversion devices 110 are changed due to a failure/accident occurred in the plurality of first power conversion devices 110, or a case where the operating states of the loads 20 are changed due to a reduction of the driving power supplied to the loads 20.

The first and second circuit breakers 130a and 130b may be opened normally and closed during operation to control the connection and disconnection between the bus line 1 and the power end and the second output end.

That is, the first circuit breaker 130a may be opened at normal times to disconnect the power end from the bus line 1, and closed during operation to connect the power end to the bus line 1. Also, the second circuit breaker 130b may be opened at normal times to disconnect the second output end from the bus line 1, and closed during operation to connect the second output end to the bus line 1.

The first circuit breaker 130a may be closed for allowing the flow of the DC power between the power end and the bus line 1, and opened for restricting the flow of the DC power between the power end and the bus line 1.

When the power supply of the plurality of first power conversion devices 110 is interrupted, the first circuit breaker 130a may be closed to connect the power end to the bus line 1, so that the DC power flows from the bus line 1 to the power end to be supplied to the power end.

When the power supply of the conversion devices 110 #1 and 110 #3 connected to the first AC power source 10 #1 and the second AC power source 10 #3 is interrupted, the first circuit breaker 130a may be closed to connect the power end to the bus line 1, such that the DC power flows from the bus line 1 to the power end to be supplied to the second power conversion device 120.

In this case, the conversion device 110 #2 connected to the battery 10 #2 may supply the DC power to the second power conversion device 120 until the DC power flowing from the bus line 1 is supplied to the second power conversion device 120 after the power supply of the conversion devices 110 #1 and 110 #3 connected to the first AC power source 10 #1 and the second AC power source 10 #3 is interrupted.

That is, the conversion device 110 #2 connected to the battery 10 #2 may maintain the supply of the DC power to the second power conversion device 120 until the supply of the DC power to the second power conversion device 120 is restored in a switching manner.

The first circuit breaker 130a may be closed only when the second circuit breaker 130b is opened.

That is, the first circuit breaker 130a may be closed to connect the power end to the bus line 1 only when the second circuit breaker 130b is opened, such that the DC power can flow from the bus line 1 to the power end.

The second circuit breaker 130b may be closed for allowing the flow (or connection) of the DC power between the power end and the bus line 1, and opened for restricting the flow of the DC power between the power end and the bus line 1.

When power supply of another power supply device connected to the bus line 1 is interrupted, the second circuit breaker 120 may be closed to connect the second output end to the bus line 1, such that the DC power flows from the second output end to the bus line 1 to be supplied to the another power supply device.

The second circuit breaker 130b may be closed only when the opening and closing mechanism of the conversion device 110 #3 connected to the second circuit breaker 130b and the first circuit breaker 130a are opened.

That is, the second circuit breaker 130b may be closed to connect the second output end and the bus line only when the opening and closing mechanism of the conversion device 110 #3 connected to the second circuit breaker 130b and the first circuit breaker 130a are opened, such that the DC power flows from the second output end to the bus line 1.

As described above, the supply device 100 which includes the plurality of first power conversion devices 110, the second power conversion device 120, and the first and second circuit breakers 130a and 130b may further include a control unit 140 that controls the plurality of first power conversion devices 110, the second power conversion device 120, and the first and second circuit breakers 130a and 130b, monitors a state of at least one of the plurality of power supply sources 10, the plurality of first power conversion devices 110, the DC power, the driving power, and the loads, and controls the first and second circuit breakers 130a and 130b to connect the power end or the second output end to the bus line 1 according to a result of the monitoring.

The control unit 140 may be a central control system of the supply device 100.

The control unit 140 may include a plurality of control elements for controlling the supply device 100.

The control unit 140 may further include a plurality of electronic devices for performing functions of the supply device 100.

For example, the control unit 140 may include at least one of a storage element for storing software/applications/programs for performing and controlling functions of the supply device 100, a dedicated control element including the storage element, a communication element, a display, and an input element.

The control unit 140 may control the plurality of first power conversion devices 110, the second power conversion device 120, and the first and second circuit breakers 130a and 130b.

The control unit 140 may include a Programmable Logic Control unit (PLC) for controlling the plurality of first power conversion devices 110, the second power conversion device 120, and the first and second circuit breakers 130a and 130b.

The control unit 140 may monitor the states of the plurality of first power conversion devices 110, the second power conversion device 120, and the first and second circuit breakers 130a and 130b, and control the operations of the plurality of first power conversion devices 110, the second power conversion device 120, and the first and second circuit breakers 130a and 130b based on a result of the monitoring.

The control unit 140 may also control operations of the plurality of first power conversion devices 110, and the second power conversion device 120, and the first and second circuit breakers 130a and 130b based on states of the plurality of power supply sources 10 and the loads 20.

The control unit 140 may control the operations of the plurality of first power conversion devices 110 to control conversion and supply of the DC power.

For example, the control unit 140 may control an operation of a control target conversion device of the plurality of first power conversion devices 110, such that the control target conversion device controls conversion and supply of the DC power with respect to the second power conversion device 120.

The control unit 140 may also control opening and closing of the opening and closing mechanisms included in the plurality of first power conversion devices 110, respectively.

The control unit 140 may control the operation of the second power conversion devices 120 to control conversion and supply of the driving power.

For example, the control unit 140 may control an operation of a control target conversion device of the second power conversion devices 120, such that the control target conversion device controls the conversion and supply of the driving power with respect to the loads 20.

The control unit 140 may also control opening and closing of the opening and closing mechanisms included in the second power conversion device 120.

The control unit 140 may control the operations of the first and second circuit breakers 130*a* and 130*b* to control reception and supply of the DC power.

For example, the control unit 140 may close the first circuit breaker 130*a* to receive the DC power from the bus line 1, or close the second circuit breaker 130*b* to supply the DC power to the bus line 1.

In this case, the control unit 140 may control the first and second circuit breakers 130*a* and 130*b* in an interlocking manner.

For example, the control unit 140 may open the second circuit breaker 130*b* when closing the first circuit breaker 130*a* to receive the DC power from the bus line 1, while opening the first circuit breaker 130*a* when closing the second circuit breaker 130*b* to supply the DC power to the bus line 1.

The control unit 140 may also control the operations of the plurality of first power conversion devices 110, the second power conversion device 120, and the first and second circuit breakers 130*a* and 130*b* based on a communication result performed with at least one of an external communication device and a control device.

For example, the control unit 140 may receive from the control device a control command for controlling the operation of at least one of the plurality of first power conversion devices 110, the second power conversion device 120, and the first and second circuit breakers 130*a* and 130*b*, and control the operation of the at least one of the plurality of first power conversion devices 110, the second power conversion device 120, and the first and second circuit breakers 130*a* and 130*b* according to the control command.

The control unit 140 may receive power from one of the plurality of power supply sources 10 and convert the power into the DC power.

That is, the control unit 140 may selectively receive power from one of the plurality of power supply sources 10.

The control unit 140 may receive power from any one of the plurality of power supply sources 10 according to a preset supply criterion and convert the power into the DC power.

The supply criterion may be a criterion for priorities of the plurality of power supply sources 10 to supply power.

For example, the supply criterion may be set in the order of the first AC power source 10 #1, the second AC power source 10 #3, and the battery 10 #2.

According to the supply criterion, the control unit 140 may receive power sequentially from the first AC power source 10 #1, the second AC power source 10 #3, and the battery 10 #2.

When power is received from the first AC power source 10 #1, the control unit 140 may control the operation of the first conversion device 110 #1 connected to the first AC power source 10 #1.

In this case, the control unit 140 may close the opening and closing mechanism of the first conversion device 110 #1 and open the opening and closing mechanisms of the second conversion device 110 #2 and the third conversion device 110 #3, so as to connect the first conversion device 110 #1 and disconnect the second conversion device 110 #2 and the third conversion device 110 #3.

When power is received from the second AC power source 10 #3, the control unit 140 may control the operation of the third conversion device 110 #3 connected to the second AC power source 10 #3.

In this case, the control unit 140 may close the opening and closing mechanism of the third conversion device 110 #3 and open the opening and closing mechanisms of the first conversion device 110 #1 and the second conversion device 110 #2, so as to connect only the third conversion device 110 #3 and disconnect the first conversion device 110 #1 and the second conversion device 110 #2.

When power is supplied from the battery 10 #2, the control unit 140 may control the operation of the second conversion device 110 #2 connected to the battery 10 #2.

In this case, the control unit 140 may close the opening and closing mechanism of the second conversion device 110 #2 and open the opening and closing mechanisms of the first conversion device 110 #1 and the third conversion device 110 #3, so as to connect only the second conversion device 110 #2 and disconnect the first conversion device 110 #1 and the third conversion device 110 #3.

The control unit 140 may select any one of the plurality of first power conversion devices 110 according to states of the plurality of power supply sources 10, such that the DC power is output to the second power conversion device 120 through the selected conversion device 110.

That is, the control unit 140 may convert the DC power through one first power conversion device 110 selected from the plurality of first power conversion devices 110 and output the converted power to the second power conversion device 120.

For example, when fault conditions have occurred in the first AC power source 10 #1 and the second AC power source 10 #3 among the plurality of power supply sources 10, the control unit 140 may select the second conversion device 110 #2 connected to the battery 10 #2. The control unit 140 may control the selected second conversion device 110 #2 to receive power from the battery 10 #2, convert the received power into the DC power, and output the DC power to each of the second power conversion devices 120.

When fault conditions have occurred in at least one of one conversion device 110, which is transferring the DC power to the second power conversion device 120, and a power supply source 10 corresponding to the one conversion device 110, the control unit 140 may control another conversion device 110 other than the one conversion device 110 to transfer the DC power to the second power conversion device 120.

When fault conditions have occurred in at least one of one conversion device 110, which is transferring the DC power to the second power conversion device 120, and a power supply source 10 corresponding to the one conversion device 110, the control unit 140 may switch the power supply source 10 currently supplying power and the one first power conversion device 110, such that another first conversion device 110 other than the one conversion device 110 can transfer the DC power to the second power conversion device 120.

For example, while receiving power from the first AC power source 10 #1 and converting the power into the DC power through the first conversion device 110 #1, when the first conversion device 110 #1 is failed or the first AC power source 10 #1 is shut down, the control unit 140 may switch the first AC power source 10 #1 which is supplying the power into the second AC power source 10 #3 and the first conversion device 110 #1 into the third conversion device 110 #3, so as to receive power from the second AC power source 10 #3, convert the received power into the DC power through the third conversion device 110 #3 and transfer the DC power to the second power conversion device 120.

In this case, while the first AC power source 10 #1 is switched to the second AC power source 10 #3 and the first conversion device 110 #1 is switched to the third conversion device 110 #3, the control unit 140 may receive power from the battery 10 #2, convert the received power into the DC power through the second conversion device 110 #2, and transfer the DC power to the second power conversion device 120.

In this way, the control unit 140, which controls the plurality of first power conversion devices 110, the second power conversion device 120, and the first and second circuit breakers 130a and 130b, may control opening and closing of the first and second circuit breakers 130a and 130b according to the state of the DC power or the driving power, so as to control the reception and supply of the DC power through the bus line 1.

For example, when the magnitude of the driving power is less than a required magnitude of the loads 20 or when the DC power is insufficient, the control unit 140 may close the first circuit breaker 130a and open the second circuit breaker 130b, such that the DC power is received from the bus line 1.

Or, when the magnitude of the driving power is larger than the required magnitude of the plurality of loads 20, or when the DC power is sufficient, the control unit 140 may close the second circuit breaker 130b to supply the DC power to the bus line 1.

In an opposite case, when a fault current flows on the power end due to a failure occurred in the plurality of first power conversion devices 110 or the second power conversion device 120 or due to abnormality occurred in the plurality of power supply sources 10 or the plurality of loads 20, the control unit 140 may open the first and second circuit breakers 130a and 130b to suppress the fault current from being supplied to the bus line 1.

When fault conditions have occurred in the plurality of power supply sources 10, the control unit 140 may close the first circuit breaker 130a to receive the DC power from another power supply device, which is connected to the bus line 1, through the bus line 1.

When fault conditions have occurred in the plurality of power supply sources 10, the control unit 140 may disconnect the plurality of power supply sources 10 and the plurality of first power conversion devices 110, and open the second circuit breaker 130b to receive the DC power from another power supply device, which is connected to the bus line 1, through the bus line 1.

For example, when fault conditions have occurred in the first AC power source 10 #1 and the second AC power source 10 #3 among the plurality of power supply sources 10, the control unit 140 may close the first circuit breaker 130a to connect the power end to the bus line 1, such that the DC power is received from another power supply device, which is connected to the bus line 1, through the bus line 1.

As such, the power end may receive the DC power through the bus line 1, and the first circuit breaker 130a may connect or disconnect the power end to or from the bus line 1 for the reception of the DC power in the opening and closing manner, thereby controlling the reception of the DC power from the another power supply device to the supply device 100.

When a fault has occurred in another power supply device connected to the bus line 1, the control unit 140 may close the second circuit breaker 130b, such that the DC power is supplied to the another power supply device through the bus line 1.

When a fault has occurred in another power supply device connected to the bus line 1, the control unit 140 may further receive power from one of the plurality of power supply sources 10. The control unit 140 may then open the first circuit breaker 130a and close the second circuit breaker 130b, such that the DC power output from the second output end is supplied to the another power supply device through the bus line 1.

For example, when a fault has occurred in the another power supply device while receiving power from the first AC power source 10 #1 among the plurality of power supply sources 10, the control unit 140 may close the second circuit breaker 130b to connect the second output end to the bus line. The control unit 140 may then control the third conversion device 110 #3 outputting the DC power to the second output end, such that the DC power converted in the third conversion device 110 #3 is supplied through the bus line 1 to the another power supply device connected to the bus line 1.

As such, the second output end may receive the DC power through the bus line 1, and the second circuit breaker 130b may connect or disconnect the second output end to or from the bus line 1 for the supply of the DC power in the opening and closing manner, thereby controlling the supply of the DC power from the supply device 100 to the another power supply device.

Accordingly, the supply device 100 according to a preferred embodiment may include a plurality of first power conversion devices 110 that converts power supplied from each of the plurality of power supply sources 10 into DC power, a second power conversion device 120 that converts the DC power into driving power for driving a plurality of loads 20 to transfer the driving power to the plurality of loads 20, a first circuit breaker 130a provided between a first output end commonly connected with outputs of the plurality of first power conversion devices 110 and a bus line 1 connected to the first output end, to control connection and disconnection between the first output end and the bus line 1, a second circuit breaker 130b provided between a second output end as an output of one of the plurality of first power conversion devices 110 and the bus line 1 connected to the second output end to control connection and disconnection between the second output end and the bus line 1, and a control unit 140 that controls opening and closing of the first and second circuit breakers 130a and 130b according to a state of the DC power or the driving power so as to control reception and supply of the DC power through the bus line 1.

Figure 4:
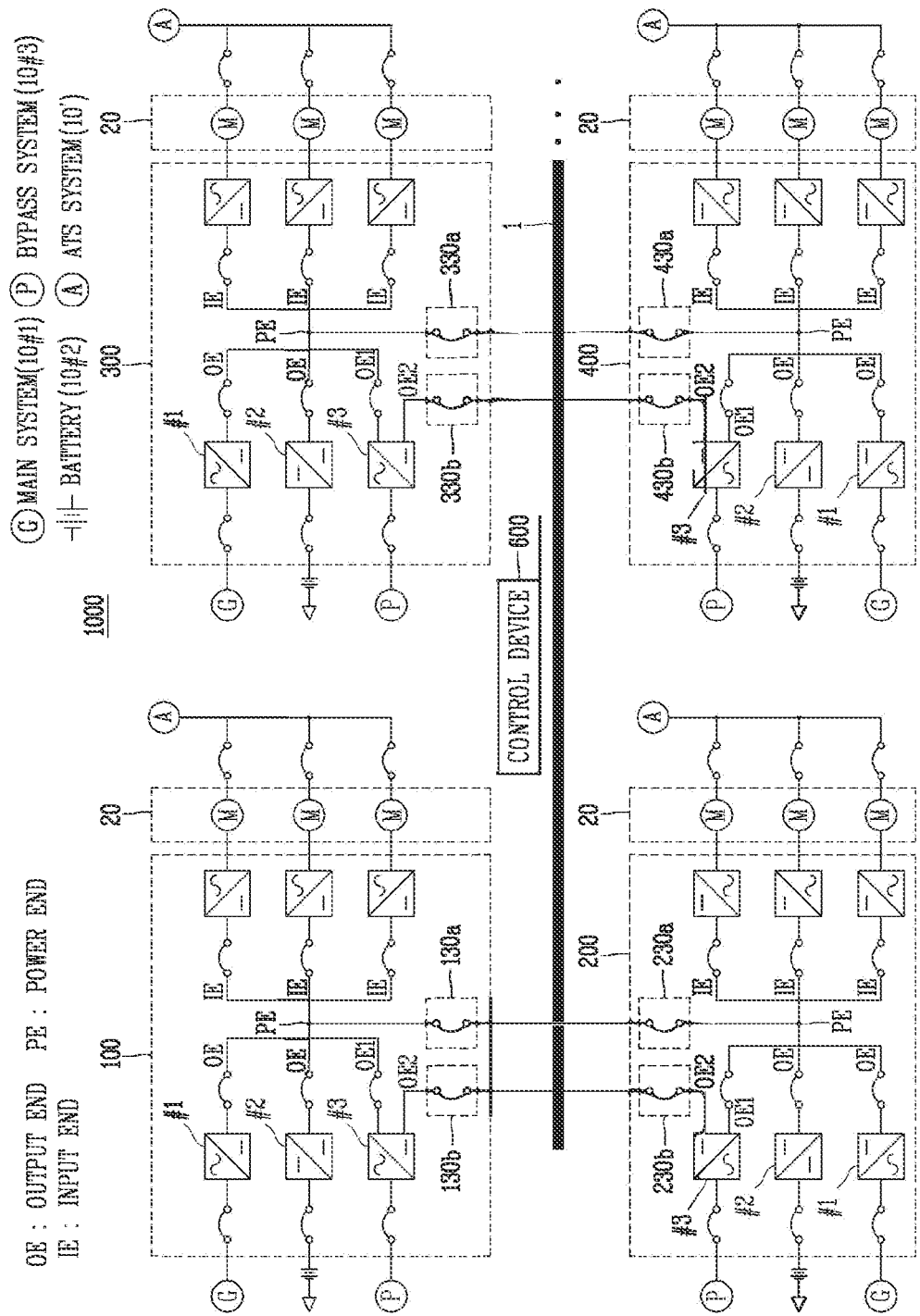
FIG. 4 is a diagram illustrating a configuration of a power supply system equipped with a power supply device in accordance with the present disclosure.

As described above, the supply device 100 which receives and supplies the DC power in connection with the bus line 1 may be included in the power supply system as illustrated in FIG. 4 to receive and supply the DC power in connection with the bus line 1.

Hereinafter, a power supply system according to the present disclosure will be described, but duplicate description with the aforementioned description will be omitted as much as possible.

In addition, the following description will be given further with respect to FIGS. 4 and 8 in addition to FIGS. 1 to 3 referenced in the foregoing description of the supply system 100, and reference numerals which are not specified in FIGS. 4 and 8 will be understood by those reference numerals specified in FIGS. 1 to 3.

An embodiment of the power supply system to be described below may be implemented independently or in combination with the embodiment of the supply device 100 described above.

The power supply system may be implemented in combination of the foregoing embodiments and embodiments to be described below or separately.

The power supply system may be a power supply system including a plurality of power supply devices.

The power supply system may be a system that includes a plurality of packaged power devices to supply power.

Here, the power device may be a power panel in which a plurality of power control devices is packaged.

The power supply system may include the power supply device 100 in plurality.

That is, the supply device 100 may be implemented by being applied to the power supply system, and the power supply system may include the supply device 100 in plurality.

The power supply system 1000 (hereinafter, referred to as a system), as illustrated in FIG. 4, may include a plurality of power panels 100, 200, 300, 400 that converts power supplied from a plurality of power supply sources 10, respectively, into DC power, converts the DC power into driving power for loads 20, and supplies the driving power to the loads 20, a bus line 1 connected to power ends to which the DC power is input from the plurality of power panels 100, 200, 300, 400, respectively, and second output ends separated from the power ends to output the DC power, so that the DC power converted in the plurality of power panels 100, 200, 300, 400 flows, a plurality of first circuit breakers 130a, 230a, 330a, 430a disposed between the respective power ends and the bus line 1, and a plurality of second circuit breakers 130b, 230b, 330b, 430b disposed between the respective second output ends and the bus line 1.

In the system 1000, the plurality of first circuit breakers 130a, 230a, 330a, 430a may be opened and closed according to an operating state of at least one of the plurality of power supply panels 100, 200, 300, 400, so as to connect or disconnect the DC power between the power ends and the bus line 1.

In the system 1000, the plurality of second circuit breakers 130b, 230b, 330b, 430b may be opened and closed according to an operating state of at least one of the plurality of power panels 100, 200, 300, 400, so as to connect or disconnect the DC power between the second output ends and the bus line 1.

Here, each of the plurality of power panels 100, 200, 300, 400 may be the power supply device 100 as illustrated in FIGS. 1 to 3.

Each of the plurality of power panels 100, 200, 300, 400, as illustrated in FIGS. 1 to 3, may include a plurality of power conversion devices 110, 210, 310, 410 that converts power supplied from the plurality of power supply sources 10 into the DC power, at least one second power conversion device 120, 220, 320, 420 that converts the DC power supplied from the plurality of first power conversion devices 110, 210, 310, 410 into the driving power to supply to the loads 20, the first circuit breaker 130a, 230a, 330a, 430a, and the second circuit breaker 130b, 230b, 330b, 430b.

Each of the plurality of power panels 100, 200, 300, 400 may be configured in different forms from the power supply device 100 as illustrated in FIGS. 1 to 3.

The system 1000 may include the plurality of power panels 100, 200, 300, 400, and the plurality of power panels 100, 200, 300, 400 may be connected commonly to the single bus line 1.

The power panel 100, 200, 300, 400 may be provided in plurality, for example, may be provided by four or more as illustrated in FIG. 4.

The plurality of power panels 100, 200, 300, 400 may preferably be provided by 5 or more in number.

Each of the plurality of power panels 100, 200, 300, 400 may convert power received from each of the plurality of power supply sources 10 into the DC power, convert the DC power into the driving power, and output the driving power to each of the loads 20.

The plurality of power supply sources 10, as illustrated in FIGS. 2 and 3, may include a first AC power source 10 #1 and a second AC power source 10 #3 each supplying AC power, and a battery power source 10 #2 storing DC power.

Here, the first AC power source 10 #1 may be a main system power source G for supplying AC power, the second AC power source 10 #3 may be a bypass system power source P supplying AC power, and the battery 10 #2 may be a battery power source B supplying DC power.

That is, the plurality of power supply sources 10, as illustrated in FIG. 4, may include a system power source G, a bypass power source P, and a battery power source B.

Accordingly, each of the plurality of power panels 100, 200, 300, 400 may receive power from each of the system power source G, the bypass power source P, and the battery power source B.

The battery power source B may store the DC power. When the power supply of the first AC power source 10 #1 and the second AC power source 10 #3 is interrupted, the battery power source B may supply the stored power to the plurality of power panels 100, 200, 300, 400 while the interrupted power supply is restored in a switching manner.

The battery power source B may uninterruptibly supply the stored power to the plurality of power panels 100, 200, 300, 400 until the interrupted power supply is restored in a switching manner.

The plurality of power supply sources 10 may further include an emergency power source A for supplying emergency power to the loads 20 when fault conditions have occurred in the first AC power source G, the second AC power source P, and the battery power source B.

The emergency power source A may supply emergency power to the loads 20 when fault conditions have occurred in the first AC power source G, the second AC power source P, and the battery power source B.

The emergency power source A may be a power source for keeping the loads 20 operated for a predetermined period of time by supplying emergency power to each load 20 when power cannot be supplied due to an occurrence of fault conditions in all of the first AC power source G, the second AC power source P, and the battery power source B each supplying power to the plurality of power panels 100, 200, 300, 400.

For example, the emergency power source A may be a power source including an emergency generator.

Each of the plurality of power panels 100, 200, 300, 400 may preferably receive power supplied from three power supply sources 10, namely, the system power source G, the bypass power source P, and the battery power source B, as illustrated in FIG. 1A, and receive power from the emergency power source A only when the power supply from the system power source G, the bypass power source P, and the battery power source B is interrupted.

Here, each of the plurality of power supply sources 10 supplying power to each of the plurality of power panels 100, 200, 300, 400 may supply power to each of the plurality of power panels 100, 200, 300, 400 in one system, or from individual switchboards.

Each of the plurality of power panels 100, 200, 300, 400, as illustrated in FIGS. 1 to 3, may include the plurality of first power conversion devices 110, 210, 310, 410 that converts power supplied from the plurality of power supply sources 10 into the DC power, the at least one second power conversion device 120, 220, 320, 420 that converts the DC power supplied from the plurality of first power conversion devices 110, 210, 310, 410 into the driving power to supply to the loads 20, the first circuit breaker 130*a*, 230*a*, 330*a*, 430*a*, the second circuit breaker 130*b*, 230*b*, 330*b*, 430*b*, and the control unit 140, 240, 340, 440.

Each of the plurality of power panels 100, 200, 300, 400 may receive power from the plurality of power supply sources 10, respectively, convert the received power into the DC power through the plurality of first power conversion devices 110, 210, 310, 410, and convert the DC power into the driving power through the second power conversion devices 120, 220, 320, 420, so that the driving power can be supplied to the loads 20.

Each of the plurality of power panels 100, 200, 300, 400 may supply the DC power to the second power conversion device 120, 220, 320, 420 through one of the plurality of first power conversion devices 110, 210, 310, 410 according to states of the plurality of power supply sources 10.

When power supply of one conversion device 110, 210, 310, 410 supplying the DC power to the second power conversion device 120, 220, 320, 420, the plurality of power panels 100, 200, 300, 400 may supply the DC power to the second power conversion device 120, 220, 320, 420 through another conversion device other than the one conversion device.

In this case, the plurality of first power conversion devices 110, 210, 310, 410 may supply the DC power to the second power conversion device 120, 220, 320, 420 through a conversion device 110 #1, 210 #1, 310 #1, 410 #1, which receives power from the battery power source B while the one conversion device is switched to the another conversion device.

Each of the plurality of power panels 100, 200, 300, 400 may preferably include three conversion devices connected to the plurality of power supply sources 10, respectively.

The plurality of first power conversion devices 110, 210, 310, 410 included in each of the plurality of power panels 100, 200, 300, 400 may output the DC power through the first output ends and the second output end that are separately provided.

The first output ends may be connected to the power end.

The DC power which is output from one of the plurality of first power conversion devices 110, 210, 310, 410 may flow along the power end.

The power end may be connected to the bus line 1 and the input end of the second power conversion device 120, 220, 320, 420, such that the DC power can be transferred to the bus line 1 or the second power conversion device 120, 220, 320, 420.

The second output end may be an output end of any one of the plurality of first power conversion devices 110, 210, 310, 410, which is separated from the power end.

Accordingly, the second output end may be an electric circuit which is separately provided from the first output end and along which the DC power output from any one of the plurality of first power conversion devices 110, 210, 310, 410 flows.

The second output end may be connected to the bus line 1 to transmit the DC power to the bus line 1.

The second output end may preferably be an output end of the third conversion device 110 #3, 210 #3, 310 #3, 410 #3 corresponding to the third power source 10 #3.

According to this, the second output end may be an output end of the third conversion device 110 #3, 210 #3, 310 #3, 410 #3, to which power is supplied from the bypass power source P as the third power source 10 #3.

That is, the third conversion device 110 #3, 210 #3, 310 #3, 410 #3 included in each of the plurality of power panels 100, 200, 300, 400 may output the DC power to two separate paths, namely, the first output end and the second output end. The first output end may be commonly connected to the first output ends of the first and second conversion devices 110 #1 and 110 #2, 210 #1 and 210 #2, 310 #1 and 310 #2, 410 #1 and 410 #2 and the power end, and the second output end may be provided as an independent output end, separate from the first output end.

As such, the first output ends and the second output end to which the DC power is output from the plurality of first power conversion devices 110, 210, 310, 410 may be connected to the bus line 1.

That is, the first output end may be connected to the bus line 1 and the input end of the second power conversion device 120, 220, 320, 420, to transfer the DC power to the second power conversion device 120, 220, 320, 420, and the second output end may be connected to the bus line 1 to transfer the DC power to the bus line 1.

The DC power converted in the plurality of first power conversion devices 110, 210, 310, 410 may be transferred to the second power conversion device 120, 220, 320, 420 through the output ends of the plurality of first power conversion devices 110, 210, 310, 410, respectively.

Each of the plurality of power panels 100, 200, 300, 400, as illustrated in FIG. 4, may preferably include three second power conversion devices 120, 220, 320, 420, to supply the driving power to three loads 20 through the three second power conversion devices 120, 220, 320, 420.

Here, the load 20 may be a load of an electric motor M.

Each of the plurality of power panels 100, 200, 300, 400, as illustrated in FIG. 4, may preferably include the first circuit breaker 130*a*, 230*a*, 330*a*, 430*a* provided on an electric circuit, to which the power end connected with the first output ends of the plurality of first power conversion devices 110, 210, 310, 410 and the bus line 1 are connected, to control connection and disconnection between the power end and the bus line 1.

Accordingly, the power ends of the respective power panels 100, 200, 300, 400 may be commonly connected to the bus line 1.

Each of the plurality of power panels 100, 200, 300, 400, as illustrated in FIG. 4, may preferably include the second circuit breaker 130*a*, 230*a*, 330*a*, 430*a* provided on an electric circuit, to which the second output end of one of the plurality of first power conversion devices 110, 210, 310,

410 and the bus line 1 are connected, to control connection and disconnection between the second output end and the bus line 1.

Accordingly, the second output ends of the respective power panels 100, 200, 300, 400 may be commonly connected to the bus line 1.

The first and second circuit breakers 130, 230, 330, 430 may be DC circuit breakers that cut off DC power, and may be provided on the electric circuits between the first and second output ends and the bus line 1.

The first and second circuit breakers 130, 230, 330, 430 may be normally opened and closed during operation, thereby controlling the connection and disconnection between the first and second output ends and the bus line 1.

Accordingly, the plurality of power panels 100, 200, 300, 400 may be connected to or disconnected from the bus line 1 by opening or closing the plurality of circuit breakers 130, 230, 330, 430.

The plurality of first circuit breakers 130a, 230a, 330a, 430a may be provided between the power end of the plurality of first power conversion devices 110, 210, 310, 410 and the bus line 1 connected to the power end.

That is, the plurality of first circuit breakers 130a, 230a, 330a, 430a may be provided between the power ends of the plurality of power panels 100, 200, 300, 400 and the bus line 1, respectively, to control connection and disconnection between the plurality of power panels 100, 200, 300, 400 and the bus line 1.

According to this, the plurality of power panels 100, 200, 300, 400 may be connected to the bus line 1 through the power ends, and controlled to be disconnected from or connected to the bus line 1 by opening or closing the first circuit breakers 130a, 230a, 330a, 430a.

The plurality of second circuit breakers 130b, 230b, 330b, 430b may be provided between the second output ends of the plurality of power panels 100, 200, 300, 400 and the bus line 1 connected to the second output ends, respectively.

That is, the second circuit breakers 130b, 230b, 330b, 430b may be provided between the second output ends of the plurality of power panels 100, 200, 300, 400 and the bus line 1, to control the connection and disconnection between the plurality of power panels 100, 200, 300, 400 and the bus line 1.

According to this, the plurality of power panels 100, 200, 300, 400 may be connected to the bus line 1 through the second output ends, and controlled to be connected to or disconnected from the bus line 1 by opening or closing the second circuit breakers 130b, 230b, 330b, 430b.

The bus line 1 is a DC bus line through which DC power flows. DC power may flow through the connection between the bus line 1 and the power ends or the second output ends of the plurality of power panels 100, 200, 300, 400.

That is, the DC power may flow through the bus line 1 as the first and second circuit breakers 130, 230, 330, 430 are opened or closed.

The plurality of first circuit breakers 130a, 230a, 330a, 430a may be closed for allowing the flow (or connection) of the DC power between the power ends and the bus line 1, and opened for restricting the flow of the DC power between the power ends and the bus line 1.

The plurality of second circuit breakers 130b, 230b, 330b, 430b may be closed for allowing the flow of the DC power between the second output ends and the bus line 1, and opened for restricting the flow of the DC power between the second output ends and the bus line 1.

When the power supply of at least one of the plurality of power supply panels 100, 200, 300, 400 is interrupted, the first circuit breaker 130a, 230a, 330a, 430a of a power panel from which the power supply is interrupted, and the second circuit breaker 130b, 230b, 330b, 430b of a power panel adjacent to the interrupted power panel may be closed to connect the interrupted power panel and the adjacent power panel to the bus line 1, such that the DC power is supplied from the adjacent power panel to the interrupted power panel.

In this case, the interrupted power panel may receive the DC power from the conversion device 110 #2, 210 #2, 310 #2, 410 #2 connected to the battery power source B until the DC power is supplied from the adjacent power panel after the power supply is interrupted.

Here, the adjacent power panel which is adjacent to the interrupted power panel, may be a power panel in which the conversion device 110 #3, 210 #3, 310 #3, 410 #3 for outputting the DC power to the second output end is not operating.

That is, the adjacent power panel may be a power panel which is not receiving power from the second AC power supply 10 #3.

Accordingly, the adjacent power panel may supply the DC power to the interrupted power panel through the third conversion device 110 #3, 210 #3, 310 #3, 410 #3, which corresponds to the second output end and converts power received from the second AC power source 10 #3 into the DC power.

Each of the plurality of power panels 100, 200, 300, 400 may control and monitor the operations of the plurality of first power conversion devices 110, 210, 310, 410 and the second power conversion device 120, 220, 320, 420 included therein.

Each of the plurality of power panels 100, 200, 300, 400 may control opening and closing of the plurality of circuit breakers 130, 230, 330, 430, according to the control and monitoring results of the operations of the plurality of first power conversion devices 110, 210, 310, 410 and the second power conversion device 120, 220, 320, 420.

Each of the plurality of power panels 100, 200, 300, 400 may control and monitor the operations of the plurality of first power conversion devices 110, 210, 310, 410 and the second power conversion device 120, 220, 320, 420, so as to detect states of the DC power and the driving power.

Each of the plurality of power panels 100, 200, 300, 400 may receive power from any one of the plurality of power supply sources 10 and convert the power into the DC power.

That is, each of the plurality of power panels 100, 200, 300, 400 may be selectively supplied with power from any one of the plurality of power supply sources 10.

Each of the plurality of power panels 100, 200, 300, 400 may receive power from any one of the plurality of power supply sources 10 according to a preset supply criterion and convert the power into the DC power.

The supply criterion may be a criterion for priorities of the plurality of power supply sources 10 to supply power.

Each of the plurality of power panels 100, 200, 300, 400 may select any one of the plurality of first power conversion devices 110, 210, 310, 410 according to states of the plurality of power supply sources 10, such that the DC power can be transferred to the second power conversion device 120, 220, 320, 420 through the selected first conversion device.

That is, each of the plurality of power panels 100, 200, 300 and 400 may transfer the DC power to the second power conversion device 120, 220, 320, 420 through one first power conversion device selected according to the states of the plurality of power supply sources 10.

When a fault occurs in at least one of one conversion device which is transferring the DC power to the second power conversion device 120, 220, 320, 420 and a power supply source corresponding to the one conversion device, each of the plurality of power panels 100, 200, 300, 400 may transfer the DC power to the second power conversion device 120, 220, 320, 420 through another conversion device other than the one conversion device.

That is, when a fault occurs in at least one of one conversion device which is transferring the DC power to the second power conversion device 120, 220, 320, 420 and a power supply source corresponding to the one conversion device, each of the plurality of power panels 100, 200, 300, 400 may switch the one conversion device to another conversion device such that the DC power can be transferred to the second power conversion device 120, 220, 320, 420 through the another conversion device.

In each of the plurality of power panels 100, 200, 300, 400, when a fault occurs in at least one of one conversion device which is transferring the DC power to the second power conversion device 120, 220, 320, 420 and a power supply source corresponding to the one conversion device, a power supply source which is supplying power and a conversion device may be switched such that the DC power can be transferred to the second power conversion device 120, 220, 320, 420 through another conversion device other than the one conversion device.

The system 1000 may further include a control device 600 that monitors the state of at least one of the plurality of power panels 100, 200, 300, 400 and the plurality of first and second circuit breakers 130, 230, 330, 430, to control at least one of the plurality of power panels 100, 200, 300, 400 and the plurality of first and second circuit breakers 130, 230, 330, 430 according to a result of the monitoring.

In this way, the plurality of power panels 100, 200, 300, 400, that converts and supplies the DC power may be controlled by the control device 600.

Each of the plurality of power panels 100, 200, 300, 400 may communicate with the control device 600 and operate according to a result of the communication with the control device 600.

For example, the plurality of power panels 100, 200, 300, 400 may receive a control command from the control device 600, so as to operate according to the control command or transfer state information to the control device 600.

Each of the plurality of power panels 100, 200, 300, 400 may transmit the control and monitoring results of the plurality of first power conversion devices 110, 210, 310, 410 and the second power conversion device 120, 220, 320, 420 to the control device 600.

The control device 600 may perform communication with the plurality of power panels 100, 200, 300, 400, respectively, so as to control the plurality of power panels 100, 200, 300, 400, based on state information received from the plurality of power panels 100, 200, 300, 400.

For example, the control device 600 may control the conversion and supply of the DC power and the conversion and supply of the driving power in the plurality of power panels 100, 200, 300, 400, based on state information related to the DC power and the driving power received from each of the plurality of power panels 100, 200, 300, 400.

The control device 600 may perform communication with the plurality of power panels 100, 200, 300, 400, respectively, so as to control the conversion and supply of the driving power of the plurality of power panels 100, 200, 300, 400 or control the first and second circuit breakers 130, 230, 330, 430 included in the plurality of power panels 100, 200, 300, 400, based on state information received from the plurality of power panels 100, 200, 300, 400.

The control device 600 may also detect states of the plurality of power supply sources 10 and the loads 20 or receive information related to the states of the plurality of power supply sources 10 and the loads 20 from an external communication device, so as to control the conversion and supply of the driving power of the plurality of power panels 100, 200, 300, 400 or control the plurality of first and second circuit breakers 130, 230, 330, 430 included in the plurality of power panels 100, 200, 300, 400, based on the states of the plurality of power supply sources 10 and the loads 20.

In this case, the control device 600 may transmit a control command to the plurality of power panels 100, 200, 300, 400 to control the conversion and supply of the driving power of the plurality of power panels 100, 200, 300, 400 or control the first and second circuit breakers 130, 230, 330, 430, and 430 included in the plurality of power panels 100, 200, 300, 400, and 400. Then, the control unit 140, 240, 340, 440 included in the plurality of power panels 100, 200, 300, 400 can perform such control according to the control command.

For example, in order to shut down the power supply from the system power source G, which is supplying power to the plurality of power panels 100, 200, 300, 400, and switch the system power source G to another power supply source when a fault has occurred in the entire system power source G, the control device 600 may transmit a control command to the control units 140, 240, 340, 440, included in the plurality of power panels 100, 200, 300, 400, to open the first and second circuit breakers 130, 230, 330, 430, receive power from a power source excluding the system power source G, and convert the received power to the DC power for supply. Then, the control device 600 may open the first and second circuit breakers 130, 230, 330, 430 to receive power from the bypass power source P or the battery power source B and convert the received power into the DC power converted into the DC power for supply.

When a fault has occurred in at least one of the plurality of power panels 100, 200, 300, 400, the control device 600 may close the first circuit breaker 130a, 230a, 330a, 430a of the power panel where the fault has occurred, and the second circuit breaker 130b, 230b, 330b, 430b of a power panel closest to the fault-occurred power panel, such that the fault-occurred power panel receives the DC power from the adjacent power panel through the bus line 1.

For example, in order to supply DC power converted in any one conversion device 210 of the second power panel 200 closest to the first power panel 100 to the second power conversion device 120 of the first power panel 100 through the bus line 1 when a failure has occurred in the conversion device 110 of the first power panel 100 among the plurality of power panels 100, the control device 600 may transmit a control command to each of the first power panel 100 and the second power panel 200 to close the first circuit breaker 130a of the first power panel 100 and the second circuit breaker 130b of the second power panel 200, open the second circuit breaker 130b of the first power panel 100 and the first circuit breaker 230a of the second power panel 200, shut down the plurality of first power conversion devices 110 of the first power panel 100, and supply the DC power converted in any one of the plurality of conversion devices 210 of the second power panel 200 to the second power conversion device 120 of the first power panel 100 through the bus line 1. Accordingly, the first circuit breaker 130a of the first power panel 100 and the second circuit breaker 230b of the second power panel 200 may be closed, the second circuit breaker 130b of the first power panel 100 and the first circuit breaker 230*a* of the second power panel 200 may be open, and the DC power may be supplied from the one of the plurality of conversion devices 210 of the second power panel 200 to the second power conversion device 120 of the first power panel 100 through the bus line 1.

In this way, when a fault has occurred in at least one of the plurality of power panels 100, 200, 300, 400, the fault-occurred power panel may receive the DC power from an adjacent power panel through the bus line 1, which may allow the plurality of power panels 100, 200, 300, 400 to perform the UPS function among them.

Accordingly, the power supply system 1000 can keep supplying the driving power to the plurality of loads 20 even when unexpected fault conditions occur in the plurality of power supply sources 10, the plurality of power panels 100, 200, 300, 400, and the plurality of loads 20. Therefore, the plurality of loads 20 can continuously operate without interruption, the power supply can be made appropriately and actively, in response to such fault occurrence, and the operations of the plurality of loads 20 and the control of the power supply system 1000 can be stably achieved irrespective of type and degree of the fault occurrence.

Hereinafter, the operation of the power supply system 1000 will be described with reference to FIGS. 5 to 8.

FIGS. 5 to 8 illustrates an example in which the power supply system 1000 includes five power panels 100, 200, 300, 400, 500. The number of the plurality of power panels 100, 200, 300, 400, 500 included in the power supply system 1000 may be fewer or greater than 5 or may be 5.

The preferred embodiment of the power supply system 1000 may include five power panels 100, 200, 300, 400, 500 as illustrated in FIGS. 5 to 8, and hereinafter, a description will be given of an example in which the number of the power panel is 5 as illustrated in FIGS. 5 to 8.

Figure 5:
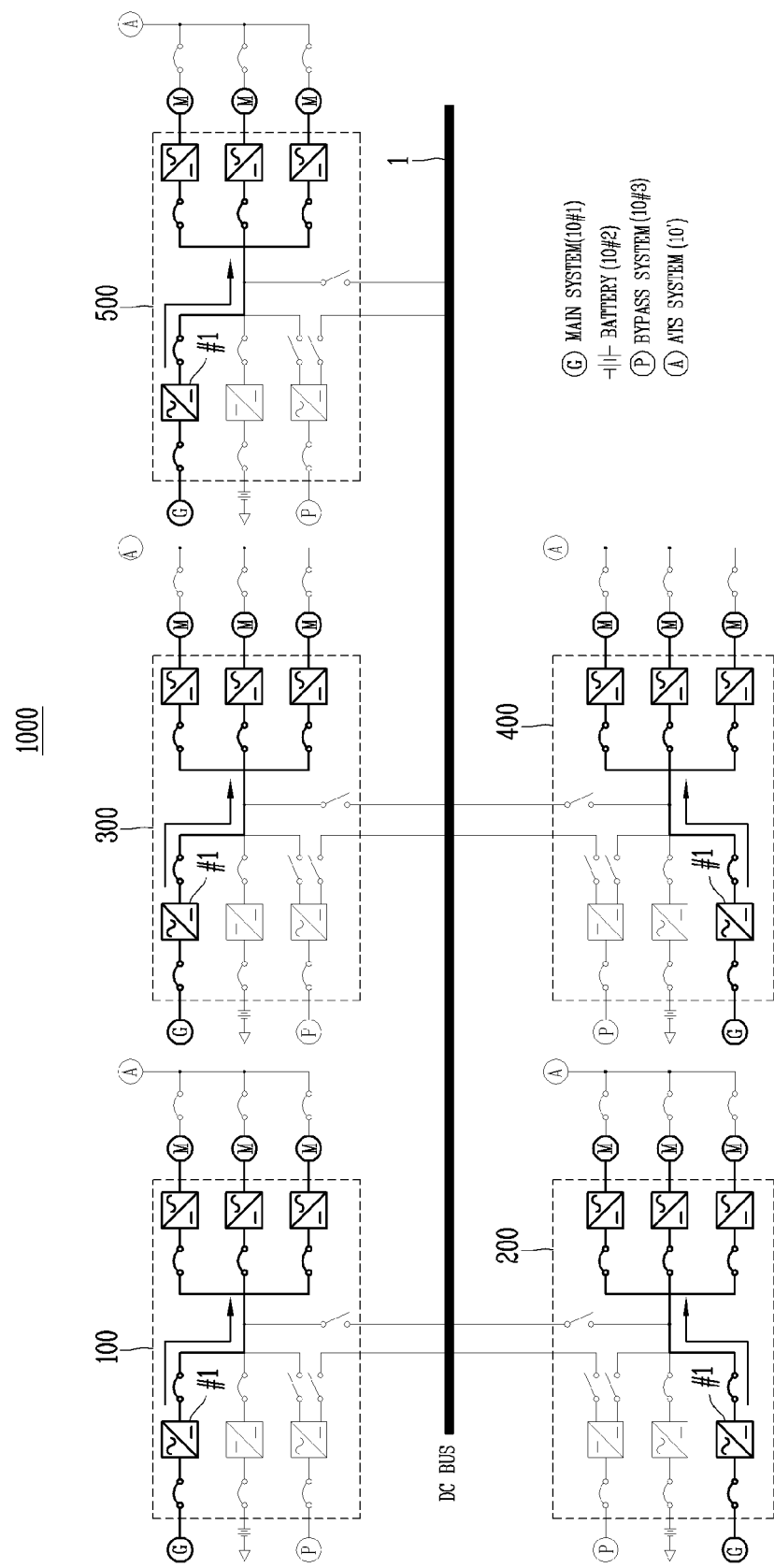
FIG. 5 is an exemplary view 1 illustrating a detailed embodiment of a power supply system in accordance with the present disclosure.

FIG. 5 illustrates a case where each of the plurality of power panels 100, 200, 300, 400, 500 receives power from the system power source G among the plurality of power supply sources 10. In this case, power may be received from the system power source G, with shutting down the power supply from the bypass power source P and the battery power source B. The supplied power may be converted sequentially into the DC power and the driving power so as to be supplied to each of the plurality of loads 20.

The example illustrated in FIG. 5 is a case of a typical operation in which the power supply system 1000 is operated by receiving power from the system power source G. The normal operation of the power supply system 1000 may be carried out in this manner.

Figure 6:
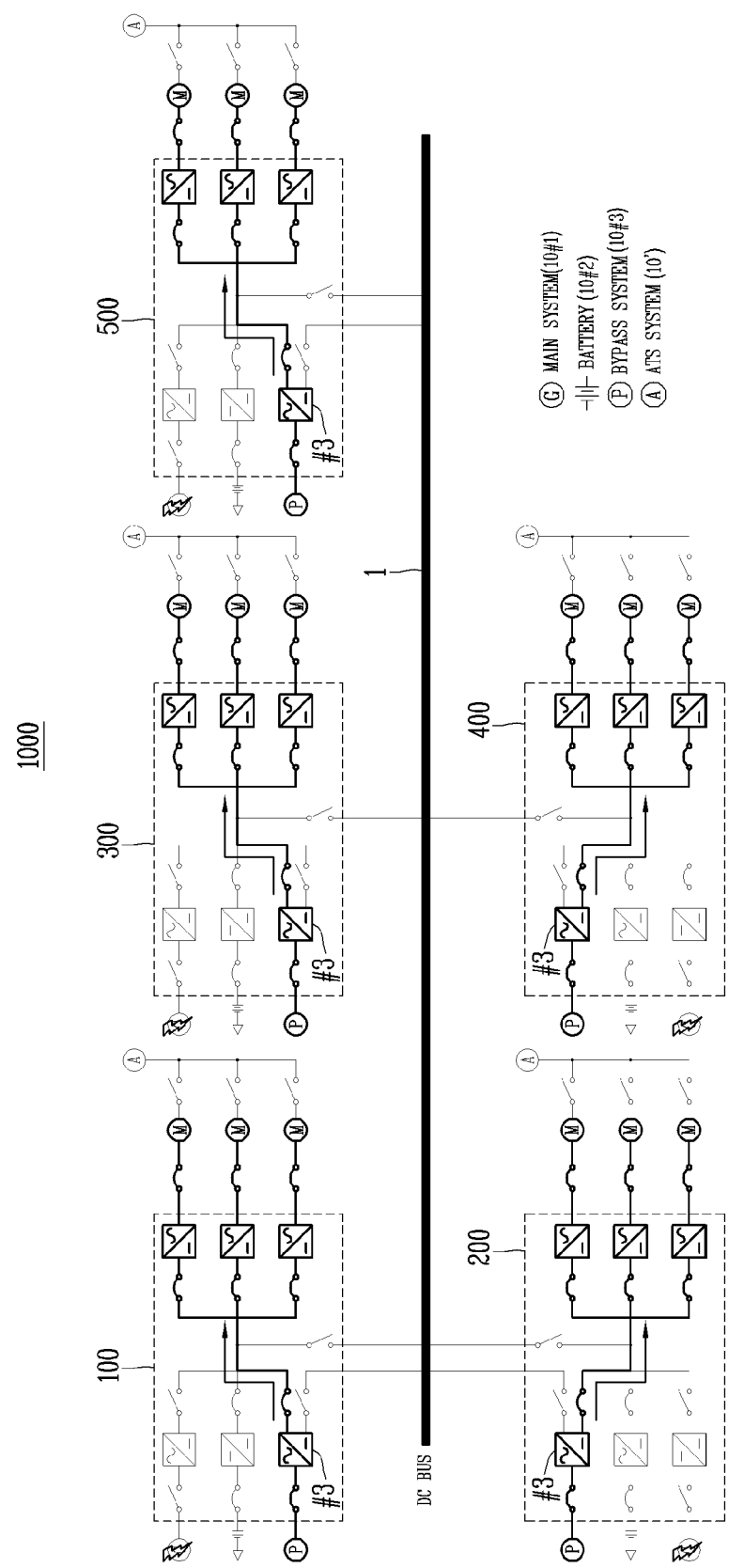
FIG. 6 is an exemplary view 2 illustrating a detailed embodiment of a power supply system in accordance with the present disclosure.

FIG. 6 illustrates a case where each of the plurality of power panels 100, 200, 300, 400, 500 receives power from the bypass power supply P among the plurality of power supply sources 10, which corresponds to a case in which a fault has occurred in the system power source G. In this case, power may be received from the bypass power source P, with shutting down the power supply from the system power source G and the battery power source B. The supplied power may be converted sequentially into the DC power and the driving power so as to be supplied to each of the plurality of loads 20.

The example illustrated in FIG. 6 is a case of a specific operation in which the power supply system 1000 is operated by receiving power from the bypass power source G. The specific operation of the power supply system 1000 may be carried out in this manner.

Figure 7:
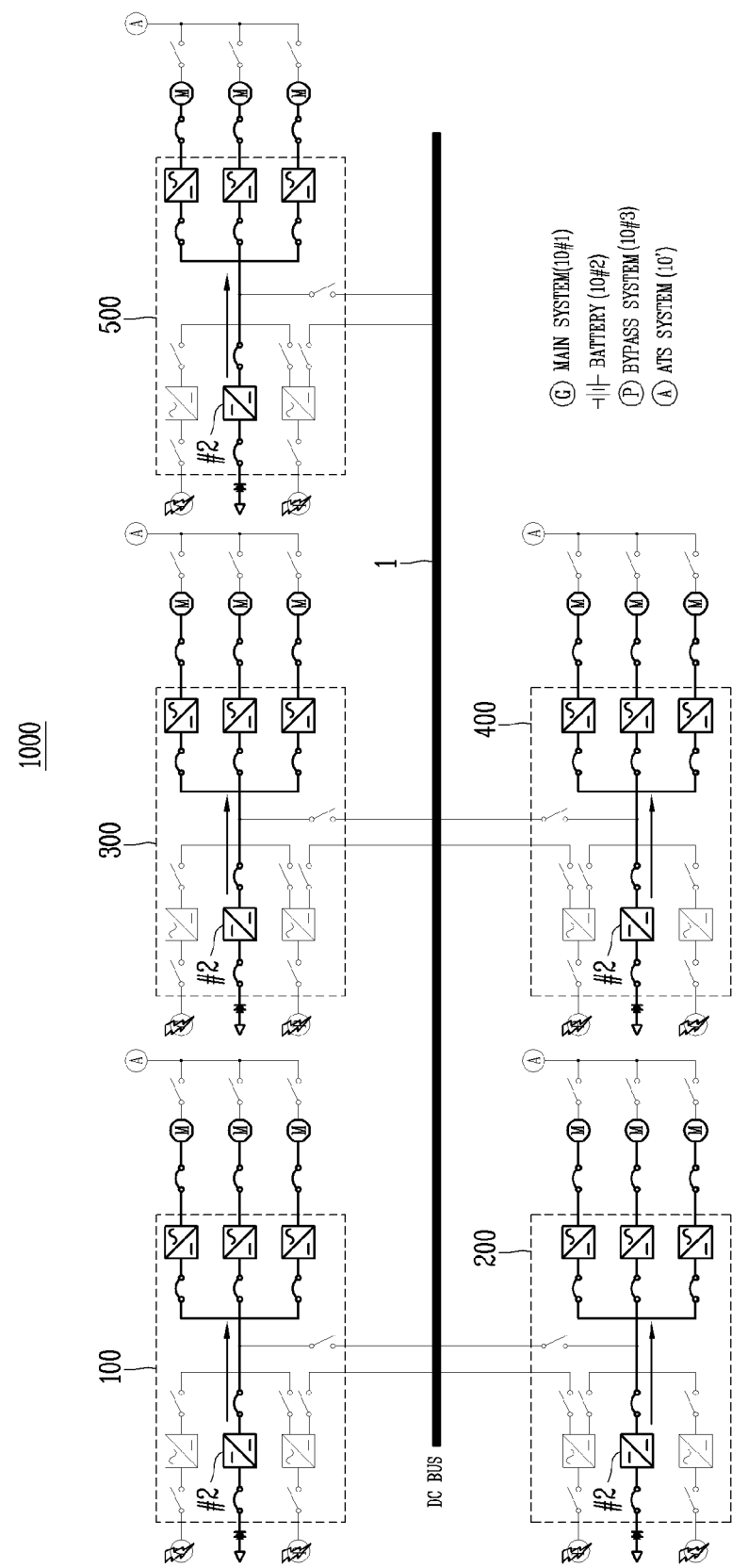
FIG. 7 is an exemplary view 3 illustrating a detailed embodiment of a power supply system in accordance with the present disclosure.

FIG. 7 illustrates a case where each of the plurality of power panels 100, 200, 300, 400, 500 receives power from the battery power source B among the plurality of power supply sources 10, which corresponds to a case in which a fault has occurred in the system power source G and the bypass power source P. In this case, power may be received from the battery power source G, with shutting down the power supply from the system power source G and the bypass power source P. The supplied power may be converted sequentially into the DC power and the driving power so as to be supplied to each of the plurality of loads 20.

The example illustrated in FIG. 7 is a case of an interruption operation in which the power supply system 1000 is operated by receiving power from the battery power source G. Such interruption operation of the power supply system 1000 may be carried out in this manner.

Figure 8:
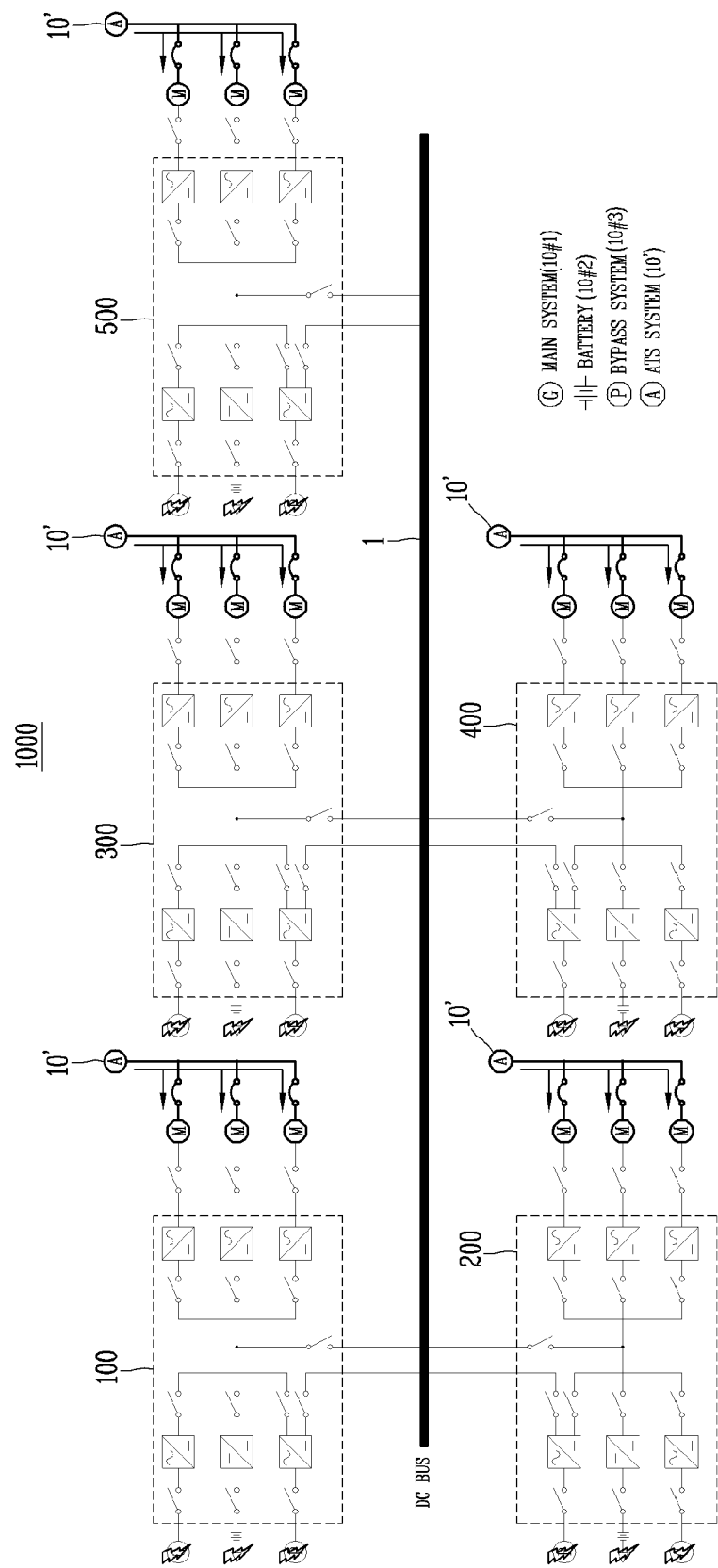
FIG. 8 is an exemplary view 4 illustrating a detailed embodiment of a power supply system in accordance with the present disclosure.

FIG. 8 illustrates a case where each of the plurality of power panels 100, 200, 300, 400, 500 receives power from the emergency power source A among the plurality of power supply sources 10, which corresponds to a case in which a fault has occurred in the system power source G, the bypass power source P, and the battery power source B. In this case, the emergency power source A may supply the driving power directly to each of the plurality of loads 20 while the power supply from the system power source G, the bypass power source P, and the battery power source B is shut down.

The example illustrated in FIG. 8 is a case of an emergency operation in which the power supply system 1000 is operated by receiving power from the emergency power source A. Such emergency operation of the power supply system 1000 may be carried out in this manner.

In this way, the power supply system 1000 may be configured such that each of the plurality of power panels 100, 200, 300, 400, 500 is operated by receiving power from the same power supply source or selectively from one of the plurality of power supply sources 10.

For example, the first and second power panels 100 and 200 may be operated by receiving power from the system power source G, the third and fourth power panels 300 and 400 may be operated by receiving power from the bypass power source P, and the fifth power panel 500 may be operated by receiving power from the battery power source B.

In addition, each of the plurality of power panels 100, 200, 300, 400, 500 may be operated by receiving power from the plurality of power supply sources 10.

For example, when the DC power is supplied from the second power panel 200 to the first power panel 100 due to a fault occurred in the first power panel 100, the second power panel 200 may convert power supplied from the system power source G into the DC power through a 2-1th conversion device 210 #1 and transfer the DC power to the second power conversion device 220. The second power panel 200 may further receive power from the bypass power source P, convert the further-received power into the DC power through a 2-3th conversion device 210 #3, and transfer the DC power converted in the 2-3th conversion device 210 #3 to each of the second power conversion devices 120 of the first power panel 100 through the bus line 1.

In the example, by closing the first circuit breaker 130*a* of the first power panel 100 and the second circuit breaker 230*b* of the second power panel 200, the first power panel 100 and the second power panel 200 may be connected to the bus line 1, such that the DC power can be supplied from the second power panel 200 to the first power panel 100 through the bus line 1.

In this way, each of the plurality of power panels 100, 200, 300, 400, 500 can be operated by receiving power from the plurality of power supply sources 10, which may allow the power supply among the plurality of power panels 100, 200, 300, 400, 500, namely, the UPS function to be performed among the plurality of power panels 100, 200, 300, 400, 500.

The embodiments of the power supply device and the power supply system according to the present disclosure may be applied to a power supply device that supplies and uses DC power, a power supply system, a method for operating the power supply system. In particular, the embodiments described above may be usefully applied to a DC UPS module and a power supply system having the same, and may also be applied to a motor control panel, a motor control system, a motor driving system, etc. for controlling a plurality of motor loads.

Although those detailed embodiments according to the present disclosure have been described, various modifications may also be made without departing from the scope of the present disclosure. Therefore, the scope of the present disclosure should not be defined by being limited to the foregoing embodiments, and should be defined not only by the claims to be described later but also by equivalents of the claims.

As described above, although the present disclosure has been described by the limited embodiments and drawings, the present disclosure is not limited to the above embodiments, and various modifications and changes may be made from the disclosure by those skilled in the art. Therefore, the idea of the present disclosure should be construed only by the claims set forth below, and all equivalent or equivalent modifications thereof will be said to belong to the scope of the idea of the present disclosure.

BRIEF DESCRIPTION OF REFERENCE NUMERALS

10: power supply source
20: load
100 (200, 300, 400, and 500): power supply device (power panel)
110 (210, 310, 410, and 510): first power conversion device (converter)
120 (220, 320, 420, and 520): second power conversion device (inverter)
130a (230a, 330a, 430a, and 530a): first circuit breaker
130b (230b, 330b, 430b, and 530b): second circuit breaker
140 (240, 340, 440, and 540): control unit
600: control device
1000: power supply system

The invention claimed is:

1. A power supply device, comprising:
a plurality of first power conversion devices to convert power supplied from a plurality of power supply sources, respectively, into Direct-Current (DC) power;
at least one second power conversion device to convert the DC power into driving power to supply the driving power to a load;
a first circuit breaker disposed between a power end, to which first output ends of the plurality of first power conversion devices connected to opening and closing mechanisms for controlling an output of the DC power and an input end of the second power conversion device are connected, and a bus line connected to the power end so that the DC power flows; and
a second circuit breaker disposed between a second output end of any one of the plurality of first power conversion devices and the bus line, wherein the first circuit breaker is configured to be opened from a closed state depending on a state of at least one of the DC power, the driving power, the plurality of first power conversion devices, and the load, that are communicatively coupled to the first circuit breaker, and wherein the second circuit breaker is configured to be opened from a closed state depending on a state of at least one of the DC power, the driving power, the plurality of first power conversion devices, and the load, that are communicatively coupled to the second circuit breaker.

2. The device of claim 1, wherein the plurality of power supply sources comprises a first Alternating-Current (AC) power source and a second AC power source to supply AC power.

3. The device of claim 2, wherein the plurality of power supply sources further comprises:
a battery to store DC power therein, and wherein the battery is configured to supply the DC power stored therein to the first power conversion devices.

4. The device of claim 3, wherein the plurality of first power conversion devices comprises:
first to third conversion devices connected to the first AC power source, the battery, and the second AC power source, respectively, to receive power from the connected power sources.

5. The device of claim 4, wherein the plurality of first power conversion devices is configured to supply the DC power to the second power conversion device.

6. The device of claim 1, wherein the first circuit breaker in the closed state connects the power end and the bus line such that the DC power is allowed to flow from the bus line to the power end so as to be supplied to the second power conversion device.

7. The device of claim 1, wherein the first circuit breaker is interlocked with the second circuit breaker so that the first circuit breaker is in the closed state only when the second circuit breaker is in an opened state.

8. The device of claim 1, wherein the second circuit breaker in the closed state connects the second output end and the bus line such that the DC power is allowed to flow from the second output end to the bus line so as to be supplied to another power supply device.

9. A power supply device, comprising:
a plurality of first power conversion devices to convert power supplied from a plurality of power supply sources, respectively, into Direct-Current (DC) power;
at least one second power conversion device to convert the DC power into driving power to supply the driving power to a load;
a first circuit breaker disposed between a power end, to which first output ends of the plurality of first power conversion devices connected to opening and closing mechanisms for controlling an output of the DC power and an input end of the second power conversion device are connected, and a bus line connected to the power end so that the DC power flows;
a second circuit breaker disposed between a second output end of any one of the plurality of first power conversion devices and the bus line; and
a control unit, configured to control the first circuit breaker and the second circuit breaker between respective open states and closed states such that:
the first circuit breaker is opened or closed depending on a state of at least one of the DC power, the driving power, the plurality of first power conversion devices, and the load, to connect or disconnect the DC power between the power end and the bus line, and the second circuit breaker is opened or closed depending on a state of at least one of the DC power, the driving power, the plurality of first power conversion devices, and the load, to connect or disconnect the DC power between the second output end and the bus line.

10. The device of claim 1, further comprising:
a control unit, configured to control the first circuit breaker and the second circuit breaker between respective open states and closed states such that:
the first circuit breaker is opened or closed depending on a state of at least one of the DC power, the driving power, the plurality of first power conversion devices, and the load, to connect or disconnect the DC power between the power end and the bus line, and
the second circuit breaker is opened or closed depending on a state of at least one of the DC power, the driving power, the plurality of first power conversion devices, and the load, to connect or disconnect the DC power between the second output end and the bus line.

* * * * *